United States Patent
Li et al.

(10) Patent No.: US 11,191,073 B2
(45) Date of Patent: Nov. 30, 2021

(54) UL SCHEDULING TIMING IN TDD WITH 1 MS TTI AND REDUCED PROCESSING TIME

(71) Applicant: TELEFONAKTIEBOLAGET LM ERICSSON (PUBL), Stockholm (SE)

(72) Inventors: Jingya Li, Sollentuna (SE); Laetitia Falconetti, Järfälla (SE); Daniel Chen Larsson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 16/325,005

(22) PCT Filed: Aug. 10, 2017

(86) PCT No.: PCT/IB2017/054887
§ 371 (c)(1),
(2) Date: Feb. 12, 2019

(87) PCT Pub. No.: WO2018/029632
PCT Pub. Date: Feb. 15, 2018

(65) Prior Publication Data
US 2019/0174496 A1    Jun. 6, 2019

Related U.S. Application Data

(60) Provisional application No. 62/374,446, filed on Aug. 12, 2016.

(51) Int. Cl.
*H04W 4/00* (2018.01)
*H04W 72/04* (2009.01)
(Continued)

(52) U.S. Cl.
CPC ... *H04W 72/0446* (2013.01); *H04W 72/1268* (2013.01); *H04W 72/14* (2013.01); *H04W 72/0413* (2013.01)

(58) Field of Classification Search
CPC ......... H04W 72/0446; H04W 72/1268; H04W 72/14; H04W 72/0413; H04L 1/1854;
(Continued)

(56) References Cited

U.S. PATENT DOCUMENTS

| | | | |
|---|---|---|---|
| 8,249,022 B2 * | 8/2012 | Dalsgaard | H04L 1/0027 370/331 |
| 8,488,535 B2 * | 7/2013 | Che | H04L 1/0026 370/329 |

(Continued)

FOREIGN PATENT DOCUMENTS

TW    I520511 B    2/2016

OTHER PUBLICATIONS

ETSI TS 136 213 V12.5.0 (Apr. 2015), pp. 1-241.*
(Continued)

*Primary Examiner* — Stephen M D Agosta
(74) *Attorney, Agent, or Firm* — Withrow & Terranova, PLLC

(57) ABSTRACT

Systems and methods are disclosed for determining and utilizing uplink scheduling timing for reduced processing time. In some embodiments, a method of operation of a wireless device in a cellular communications network comprises receiving an uplink grant in a Transmission Time Interval (TTI) n, determining an uplink scheduling timing l based on a configured Time Division Duplexing (TDD) uplink/downlink configuration, and transmitting, in a TTI n+I, an uplink transmission in accordance with the uplink grant received in the TTI n. The uplink scheduling timing I is a number of TTIs that is larger than or equal to a predefined minimum uplink scheduling timing value such that n+I is an uplink TTI and the predefined minimum uplink scheduling timing value is 2 or 3.

35 Claims, 16 Drawing Sheets

(51) Int. Cl.
*H04W 72/12* (2009.01)
*H04W 72/14* (2009.01)

(58) Field of Classification Search
CPC ... H04L 1/1861; H04L 5/0042; H04L 5/0007; H04L 5/001; H04L 5/0048; H04L 5/0055; H04B 7/0452
See application file for complete search history.

(56) References Cited

U.S. PATENT DOCUMENTS

| | | | |
|---|---|---|---|
| 9,131,501 B2* | 9/2015 | Gonsa | H04B 7/2606 |
| 9,913,255 B2* | 3/2018 | Wu | H04W 72/0406 |
| 9,942,881 B2* | 4/2018 | Sahlin | H04L 5/14 |
| 9,949,284 B2* | 4/2018 | Wu | H04W 72/12 |
| 2010/0150114 A1* | 6/2010 | Che | H04L 1/0026 370/336 |
| 2011/0141952 A1* | 6/2011 | Wang | H04L 1/1812 370/294 |
| 2012/0213192 A1* | 8/2012 | Kiyoshima | H04L 1/1607 370/330 |
| 2012/0307781 A1 | 12/2012 | Enomoto et al. | |
| 2013/0044706 A1 | 2/2013 | Suzuki et al. | |
| 2013/0308610 A1* | 11/2013 | Bergstrom | H04W 56/005 370/336 |
| 2014/0153448 A1* | 6/2014 | Ribeiro | H04L 5/14 370/280 |
| 2015/0036559 A1* | 2/2015 | Zhang | H04L 1/1864 370/280 |
| 2015/0078216 A1* | 3/2015 | Ribeiro | H04W 72/0473 370/278 |
| 2015/0264662 A1* | 9/2015 | Sahlin | H04W 72/04 370/280 |
| 2015/0365965 A1* | 12/2015 | Wu | H04L 1/1812 370/328 |
| 2016/0020891 A1* | 1/2016 | Jung | H04W 72/0446 370/280 |
| 2016/0081108 A1 | 3/2016 | Tseng | |
| 2016/0278050 A1* | 9/2016 | Nory | H04W 16/14 |
| 2016/0345352 A1* | 11/2016 | Langereis | H04B 1/40 |
| 2016/0360550 A1* | 12/2016 | Chen | H04L 5/1469 |
| 2018/0376497 A1* | 12/2018 | You | H04W 72/1284 |
| 2019/0104520 A1* | 4/2019 | Kim | H04L 5/0055 |
| 2019/0191434 A1* | 6/2019 | Hugl | H04L 5/0096 |

OTHER PUBLICATIONS

International Search Report and Written Opinion for International Patent Application No. PCT/IB2017/054887, dated Nov. 29, 2017, 17 pages.

Office Action for Taiwanese Patent Application No. 106127379, dated Oct. 31, 2019, 8 pages.

"3rd Generation Partnership Project; Technical Specification Group Radio Access Network; Evolved Universal Terrestrial Radio Access (E-UTRA); Physical layer procedures (Release 13)", 3GPP TS 36.213 V13.0.1, Jan. 2016.

"3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015.

Ericsson, "HARD and UL scheduling timings for 1ms TTI and reduced processing time", 3GPP TSG-RAN WG1 Meeting #86bis, R1-1610341, Sep. 30, 2016.

LG Electronics, et al. "WF on UL scheduling timing for FS2 with shortened processing timing in 1ms TTI", 3GPP TSG-RAN WG1 Meeting #87, R1-1613403, Nov. 19, 2016.

Nokia, et al. "UL scheduling timing for FS2 with 1ms TTI", 3GPP TSG-RAN WG1 Meeting #87, R1-1612786, Nov. 13, 2016.

Qualcomm Incorporated, "FS2 aspects for shortened processing time for 1ms TTI", 3GPP TSG-RAN WG1 Meeting #89, R1-1708760, May 14, 2017.

Ericsson, "Supported HARD timings for 1ms TTI and reduced processing time", 3GPP TSG-RAN WG1 Meeting #86, R1-167501, Aug. 12, 2016.

CMCC, "Discussion on PUSCH transmission for UpPTS", 3GPP TSG-RAN WG1 Meeting #85, R1-164884, May 13, 2016.

* cited by examiner $k_0$ = 3 MS, NO PUSCH IN UpPTS, UL SCHEDULING TIMING FOR TDD DL/UL CONFIGURATION 0

$k_0$ = 4 MS, PUSCH IN UpPTS, UL SCHEDULING TIMING FOR TDD DL/UL CONFIGURATION 0

$k_0 = 3$ MS, PUSCH IN UpPTS, UL SCHEDULING TIMING FOR TDD DL/UL CONFIGURATION 0

$k_0 = 3$ OR 2MS, NO PUSCH IN UpPTS, UL SCHEDULING TIMING FOR TDD DL/UL CONFIGURATION 1

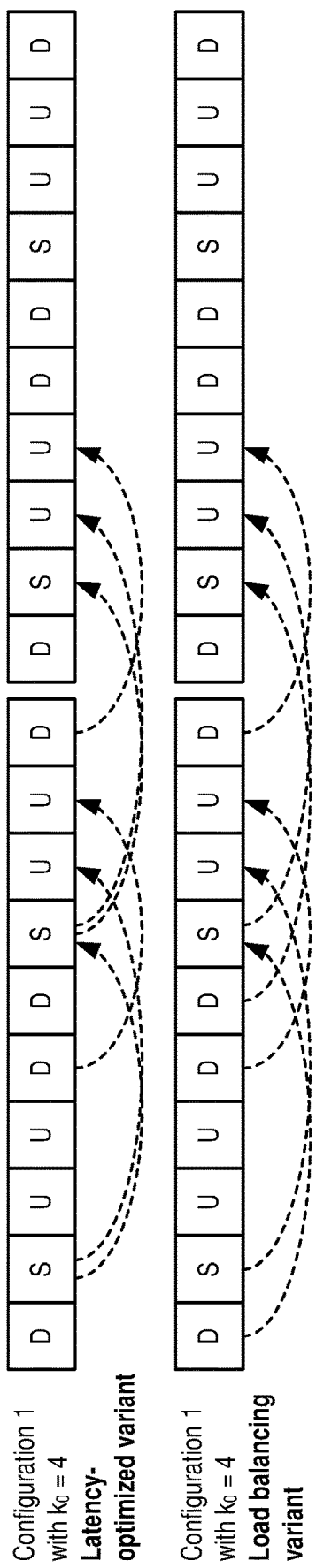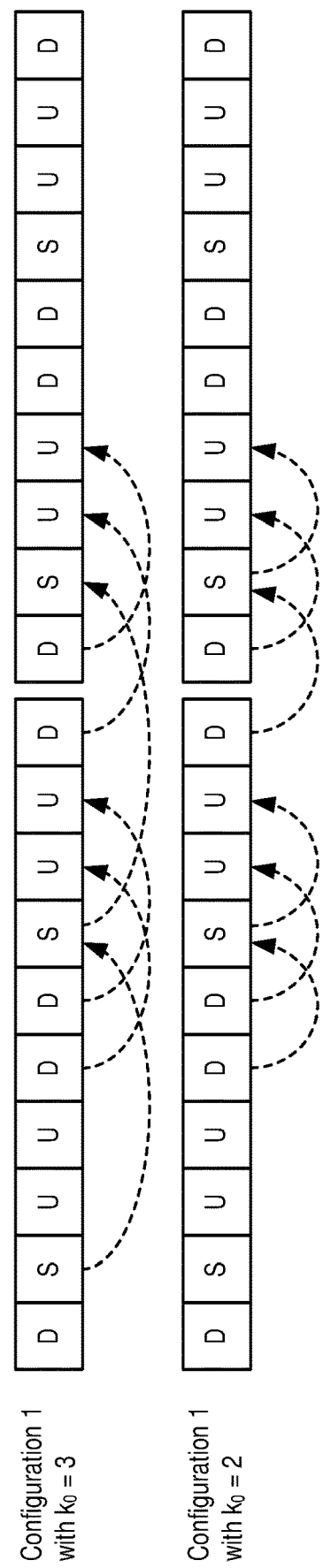

$k_0 = 3$ OR 2MS, NO PUSCH IN UpPTS, UL SCHEDULING TIMING FOR TDD DL/UL CONFIGURATION 2

$k_0 = 4, 3$ OR 2MS, PUSCH IN UpPTS, UL SCHEDULING TIMING FOR TDD DL/UL CONFIGURATION 2

$k_0 = 3$, NO PUSCH IN UpPTS, UL SCHEDULING TIMING FOR TDD DL/UL CONFIGURATION 3

$k_0 = 2$, NO PUSCH IN UpPTS, UL SCHEDULING TIMING FOR TDD DL/UL CONFIGURATION 3

$k_0 = 4$ OR 3, PUSCH IN UpPTS, UL SCHEDULING TIMING FOR TDD DL/UL CONFIGURATION 3

$k_0 = 2$, PUSCH IN UpPTS, UL SCHEDULING TIMING FOR TDD DL/UL CONFIGURATION 3

$k_0 = 2$ OR 3, NO PUSCH IN UpPTS, UL SCHEDULING TIMING FOR TDD DL/UL CONFIGURATION 4

$k_0 = 2$ OR 3 OR 4, PUSCH IN UpPTS, UL SCHEDULING TIMING FOR TDD DL/UL CONFIGURATION 4

$k_0$ = 2 OR 3, NO PUSCH IN UpPTS, UL SCHEDULING TIMING FOR TDD DL/UL CONFIGURATION 5

$k_0$ = 4, 3 OR 2, NO PUSCH IN UpPTS, UL SCHEDULING TIMING FOR TDD DL/UL CONFIGURATION 5

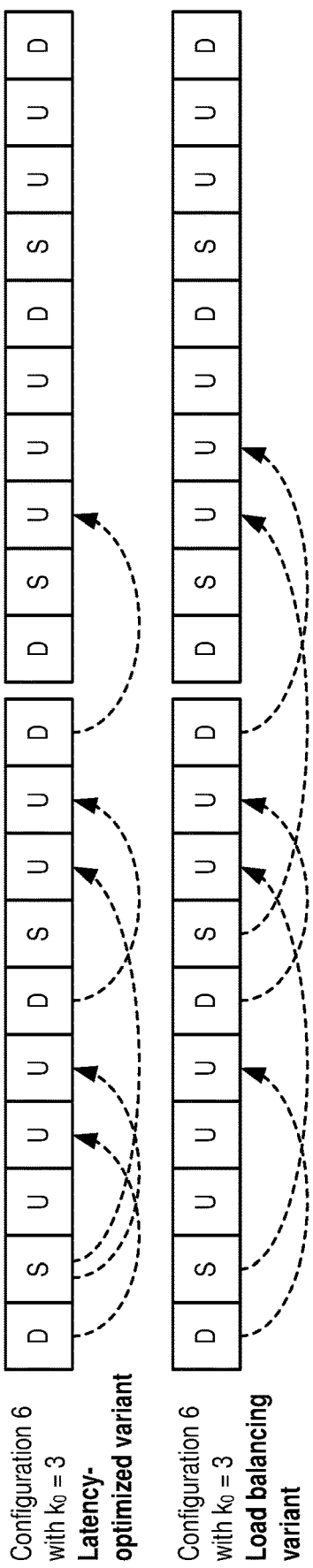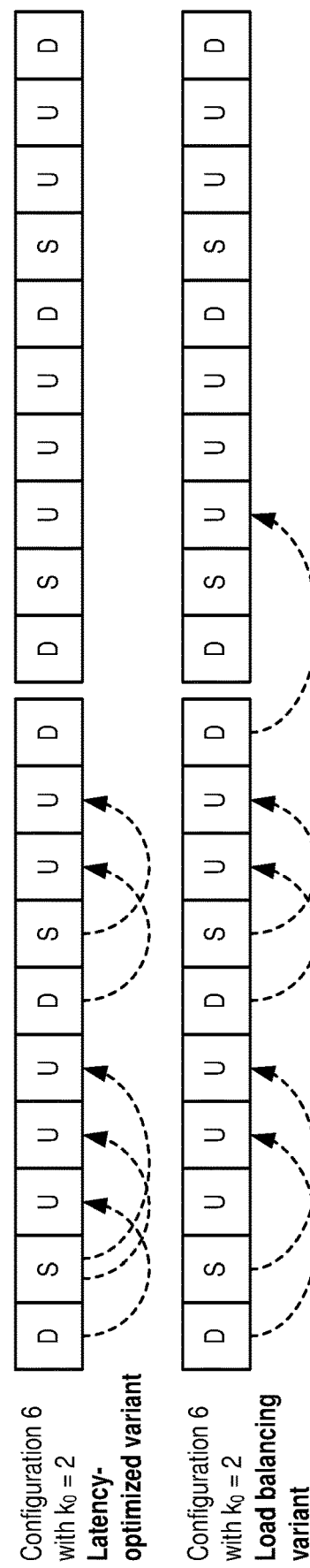

$k_0 = 4$, PUSCH IN UpPTS, UL SCHEDULING TIMING FOR TDD DL/UL CONFIGURATION 6

$k_0 = 3$, PUSCH IN UpPTS, UL SCHEDULING TIMING FOR TDD DL/UL CONFIGURATION 6

$k_0 = 2$, PUSCH IN UpPTS, UL SCHEDULING TIMING FOR TDD DL/UL CONFIGURATION 6

UL SCHEDULING TIMING IN TDD WITH 1 MS TTI AND REDUCED PROCESSING TIME

RELATED APPLICATIONS

This application is a national stage application of International Patent Application No. PCT/IB2017/054887, filed Aug. 10, 2017, which claims the benefit of U.S. provisional patent application Ser. No. 62/374,446, filed Aug. 12, 2016, the disclosures of which are hereby incorporated herein by reference in their entirety.

TECHNICAL FIELD

The present disclosure relates to uplink scheduling timing in a Time Division Duplexing (TDD) system.

BACKGROUND

In Third Generation Partnership Project (3GPP) Technical Specification (TS) 36.211, three radio frame structures are supported. Frame Structure (FS) type 1 (FS 1) is applicable to Frequency Division Duplexing (FDD) only, FS type 2 (FS 2) is applicable to Time Division Duplexing (TDD) only, and FS type 3 (FS 3) is applicable to License Assisted Access (LAA) secondary cell operation only.

With FS 2 for TDD, each radio frame of length 10 milliseconds (ms) consists of two half-frames of length 5 ms each. Each half-frame consists of five Subframes (SFs) of length 1 ms. Each SF is defined by two slots of length 0.5 ms each. Within each radio frame, a subset of SFs are reserved for uplink transmissions, and the remaining SFs are allocated for downlink transmissions, or for special SFs, where the switch between downlink and uplink occurs.

As shown in Table 1, copied from 3GPP TS 36.211 V13.0.0, seven different downlink/uplink configurations are supported for FS 2. Here, "D" denotes a downlink SF, "U" denotes an uplink SF, and "S" represents a special SF. Configurations 0, 1, 2, and 6 have 5 ms downlink-to-uplink switch-point periodicity, with the special SF existing in both SF 1 and SF 6. Configurations 3, 4, and 5 have 10 ms downlink-to-uplink switch-point periodicity, with the special SF in SF 1 only.

TABLE 1

Downlink/Uplink Configurations

| DL/UL configuration | DL-to-UL Switch-point periodicity | SF number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

A special SF is split into three parts: a downlink part (Downlink Part of a Special Subframe (DwPTS)), GP (Guard Period) and an uplink part (Uplink Part of a Special Subframe (UpPTS)). The DwPTS with duration of more than three symbols can be treated as a normal downlink SF for data transmission. However, the UpPTS is not used for data transmission due to the very short duration in the first releases of Long Term Evolution (LTE). Instead, UpPTS can be used for channel sounding or random access. In LTE Release 14 the possibility of using UpPTS for data transmission will be specified for a specific special SF configuration.

Typically, the downlink/uplink configuration and the configuration of the special SF used in a cell are signaled as part of the system information, which is included in System Information Block 1 (SIB1) and broadcasted every 80 ms within SF 5.

Hybrid Automatic Repeat Request (HARQ) timing is defined as the time relation between the reception of data in a certain HARQ process and the transmission of the HARQ acknowledgement. Based on this timing, the receiver is able to know to which HARQ process a received acknowledgement is associated.

In TDD, an uplink HARQ acknowledgement is only allowed to be transmitted in an uplink SF, and a downlink HARQ acknowledgement is only possible in Physical HARQ Indicator Channel (PHICH) of downlink SF and DwPTS. The HARQ acknowledgement of a transport block in SF n is transmitted in SF n+k, where k≥4. The value of k depends on the downlink/uplink configuration, and is given in Table 2 and Table 3 for downlink and uplink transmissions, respectively [3GPP TS 36.213 V13.0.1].

TABLE 2

HARQ Timing k for Downlink Transmissions

| TDD DL/UL configuration | SF index n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | — | 4 | 6 | — | — | — |
| 1 | 7 | 6 | — | — | 4 | 7 | 6 | — | — | 4 |
| 2 | 7 | 6 | — | 4 | 8 | 7 | 6 | — | 4 | 8 |
| 3 | 4 | 11 | — | — | — | 7 | 6 | 6 | 5 | 5 |
| 4 | 12 | 11 | — | — | 8 | 7 | 7 | 6 | 5 | 4 |
| 5 | 12 | 11 | — | 9 | 8 | 7 | 6 | 5 | 4 | 13 |
| 6 | 7 | 7 | — | — | — | 7 | 7 | — | — | 5 |

TABLE 3

HARQ Timing k for Uplink Transmissions

| TDD DL/UL configuration | SF index n | | | | | | | | | |
|---|---|---|---|---|---|---|---|---|---|---|
| | 0 | 1 | 2 | 3 | 4 | 5 | 6 | 7 | 8 | 9 |
| 0 | — | — | 4 | 7 | 6 | — | — | 4 | 7 | 6 |
| 1 | — | — | 4 | 6 | — | — | — | 4 | 6 | — |
| 2 | — | — | 6 | — | — | — | — | 6 | — | — |
| 3 | — | — | 6 | 6 | 6 | — | — | — | — | — |
| 4 | — | — | 6 | 6 | — | — | — | — | — | — |
| 5 | — | — | 6 | — | — | — | — | — | — | — |
| 6 | — | — | 4 | 6 | 6 | — | — | 4 | 7 | — |

Uplink scheduling timing refers to the time relation between a received uplink grant in downlink SF n and the uplink transmission in uplink SF n+l.

In TDD, the value of l depends on the downlink/uplink configuration. For downlink/uplink configurations 1-6, the values of l are given in Table 4, copied from Table 8-2 in 3GPP TS 36.213 V13.0.1.

For downlink/uplink configuration 0, the value of l also depends on the Uplink Index (UI) field of the uplink Downlink Control Information (DCI) transmitted in downlink SF n:

If the Most Significant Bit (MSB) (i.e., the left-most bit) of the UI is set to 1, the value of l is obtained from Table 4;

If the Least Significant Bit (LSB) (i.e., the right-most bit) of the UI is set to 1, the value of l is 7;

If both the MSB and the LSB of the UI are set to 1, the value of l is 7 and the value obtained from Table 4.

Table 5 gives the uplink scheduling timing table for TDD downlink/uplink configuration 0.

TABLE 4

Uplink Scheduling Timing l for Uplink Transmissions

| TDD DL/UL configuration | SF index n | | | | | | | | | |
|---|---|---|---|---|---|---|---|---|---|---|
| | 0 | 1 | 2 | 3 | 4 | 5 | 6 | 7 | 8 | 9 |
| 0 | | 4 | 6 | | | 4 | 6 | | | |
| 1 | | | 6 | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | | 7 | 7 | | | 7 | 7 | | | 5 |

TABLE 5

Uplink Scheduling Timing l for TDD Downlink/Uplink Configuration 0

| UL index | DL/special SF | UL timing, l | Scheduled UL SF index |
|---|---|---|---|
| 10 | 0 | 4 | 4 |
| | 1 | 6 | 7 |
| | 5 | 4 | 9 |
| | 6 | 6 | 2 |
| 01 | 0 | 7 | 7 |
| | 1 | 7 | 8 |
| | 5 | 7 | 2 |
| | 6 | 7 | 3 |
| 11 | 0 | 4, 7 | 4, 7 |
| | 1 | 6, 7 | 7, 8 |
| | 5 | 4, 7 | 9, 2 |
| | 6 | 6, 7 | 2, 3 |

Packet data latency is one of the performance metrics that vendors, operators, and also end-users (via speed test applications) regularly measure. Latency measurements are done in all phases of a radio access network system lifetime, when verifying a new software release or system component, when deploying a system, and when the system is in commercial operation.

Shorter latency than previous generations of 3GPP Radio Access Technology (RATs) was one performance metric that guided the design of LTE. LTE is also now recognized by the end-users to be a system that provides faster access to the Internet and lower data latencies than previous generations of mobile radio technologies.

Packet data latency is important not only for the perceived responsiveness of the system; it is also a parameter that indirectly influences the throughput of the system. Hypertext Transfer Protocol (HTTP)/Transmission Control Protocol (TCP) is the dominating application and transport layer protocol suite used on the Internet today. According to HTTP Archive (http://httparchive.org/trends.php), the typical size of HTTP based transactions over the Internet are in the range of a few tens of kilobytes up to one megabyte. In this size range, the TCP slow start period is a significant part of the total transport period of the packet stream. During TCP slow start the performance is latency limited. Hence, improved latency can rather easily be showed to improve the average throughput for this type of TCP based data transactions.

Radio resource efficiency could be positively impacted by latency reductions. Lower packet data latency could increase the number of transmissions possible within a certain delay bound; hence, higher Block Error Rate (BLER) targets could be used for the data transmissions freeing up radio resources potentially improving the capacity of the system.

One key factor to achieve packet latency reductions is the reduction of processing time for data and control signaling. In LTE Release 8, a downlink Transmission Time Interval (TTI) n corresponds to one SF of length 1 ms and it requires 3 ms for the User Equipment device (UE) to detect the downlink assignment, decode the downlink data, and prepare the HARQ feedback to be sent in uplink. The HARQ feedback in uplink is then sent in the uplink TTI n+4. This is valid for FDD. For TDD, the timing is minimum n+4 but can be later depending on the TDD uplink/downlink configuration. The exact HARQ timing for TDD is given in form of tables in the specifications as mentioned earlier. Similarly, if the enhanced or evolved Node B (eNB) sends an uplink grant in the downlink TTI n, the uplink transmission occurs in uplink TTI n+4 in FDD or n+4 or later for TDD.

SUMMARY

Systems and methods relating to uplink scheduling timing for reduced processing time are disclosed. In some embodiments, a method of operation of a wireless device in a cellular communications network comprises receiving an uplink grant in a Transmission Time Interval (TTI) n, determining an uplink scheduling timing l based on a configured Time Division Duplexing (TDD) uplink/downlink configuration, and transmitting, in a TTI n+l, an uplink transmission in accordance with the uplink grant received in the TTI n. The uplink scheduling timing l is a number of TTIs that is larger than or equal to a predefined minimum uplink scheduling timing value such that n+l is an uplink TTI and the predefined minimum uplink scheduling timing value is 2 or 3.

In some embodiments, the uplink scheduling timing l is a smallest integer number of TTIs that is larger than or equal to a predefined minimum uplink scheduling timing value such that n+l is an uplink TTI and the predefined minimum uplink scheduling timing value is 2 or 3.

In some embodiments, the uplink grant schedules multiple uplink TTIs for the same wireless device.

In some embodiments, the uplink grant comprises an indication of one or more uplink TTIs for which the uplink grant is valid.

In some embodiments, an uplink part of special Subframes (SFs) can be used for uplink data transmission, and determining the uplink scheduling timing l comprises determining the uplink scheduling timing l in such a manner that the uplink part of the special SFs are treated as uplink TTIs. In some other embodiments, determining the uplink scheduling timing l comprises determining the uplink scheduling timing l in such a manner that the uplink part of the special SFs are not treated as uplink TTIs.

In some embodiments, the configured TDD uplink/downlink configuration is Long Term Evolution (LTE) TDD uplink/downlink configuration 1, and determining the uplink scheduling timing l comprises determining the uplink scheduling timing l such that the uplink scheduling timing l is 3 if n=0, the uplink scheduling timing l is 5 if n=1, the uplink scheduling timing l is 3 if n=4, the uplink scheduling timing l is 3 if n=5, the uplink scheduling timing l is 5 if n=6, and the uplink scheduling timing l is 3 if n=9.

In some embodiments, the configured TDD uplink/downlink configuration is LTE TDD uplink/downlink configuration 2, and determining the uplink scheduling timing l comprises determining the uplink scheduling timing l such that the uplink scheduling timing l is 3 if n=3, the uplink scheduling timing l is 3 if n=4, the uplink scheduling timing l is 3 if n=8, and the uplink scheduling timing l is 3 if n=9.

In some embodiments, the configured TDD uplink/downlink configuration is LTE TDD uplink/downlink configuration 3, and determining the uplink scheduling timing l comprises determining the uplink scheduling timing l such that the uplink scheduling timing l is 3 if n=0, the uplink scheduling timing l is 3 if n=1, the uplink scheduling timing l is 3 if n=8, and the uplink scheduling timing l is 3 if n=9.

In some embodiments, the configured TDD uplink/downlink configuration is LTE TDD uplink/downlink configuration 4, and determining the uplink scheduling timing l comprises determining the uplink scheduling timing l such that the uplink scheduling timing l is 3 if n=0, the uplink scheduling timing l is 3 if n=8, and the uplink scheduling timing l is 3 if n=9.

In some embodiments, the configured TDD uplink/downlink configuration is LTE TDD uplink/downlink configuration 5, and determining the uplink scheduling timing l comprises determining the uplink scheduling timing l such that the uplink scheduling timing l is 3 if n=8 and the uplink scheduling timing l is 3 if n=9.

In some embodiments, determining the uplink scheduling timing l comprises determining the uplink scheduling timing l based on the configured TDD uplink/downlink configuration and an Uplink Index (UI) comprises the uplink grant received in the TTI n.

In some embodiments, the TTI n and the TTI n+l are 1 millisecond (ms) TTIs.

Embodiments of a wireless device for a cellular communications network are also disclosed. In some embodiments, a wireless device for a cellular communications network is adapted to receive an uplink grant in a TTI n, determine an uplink scheduling timing l based on a configured TDD uplink/downlink configuration, and transmit, in a TTI n+l, an uplink transmission in accordance with the uplink grant received in the TTI n. The uplink scheduling timing l is a number of TTIs that is larger than or equal to a predefined minimum uplink scheduling timing value such that n+l is an uplink TTI and the predefined minimum uplink scheduling timing value is 2 or 3.

In some embodiments, the wireless device is further adapted to perform the method of operation of a wireless device according to any other embodiments of the method of operation of a wireless device disclosed herein.

In some embodiments, a wireless device for a cellular communications network comprises at least one transceiver, at least one processor, and memory comprising instructions executable by the at least one processor whereby the wireless device is operable to receive an uplink grant in a TTI n, determine an uplink scheduling timing l based on a configured TDD uplink/downlink configuration, and transmit, in a TTI n+l, an uplink transmission in accordance with the uplink grant received in the TTI n. The uplink scheduling timing l is a number of TTIs that is larger than or equal to a predefined minimum uplink scheduling timing value such that n+l is an uplink TTI and the predefined minimum uplink scheduling timing value is 2 or 3.

In some embodiments, a wireless device for a cellular communications network comprises a receiving module, a determining module, and a transmitting module. The receiving module is operable to receive an uplink grant in a TTI n. The determining module is operable to determine an uplink scheduling timing l based on a configured TDD uplink/downlink configuration. The transmitting module is operable to transmit, in a TTI n+l, an uplink transmission in accordance with the uplink grant received in the TTI n. The uplink scheduling timing l is a number of TTIs that is larger than or equal to a predefined minimum uplink scheduling timing value such that n+l is an uplink TTI and the predefined minimum uplink scheduling timing value is 2 or 3.

Embodiments of a method of operation of a radio access node in a cellular communications network are also disclosed. In some embodiments, a method of operation of a radio access node in a cellular communications network comprises transmitting an uplink grant to a wireless device in a TTI n and receiving, in a TTI n+l, an uplink transmission from the wireless device in accordance with the uplink grant transmitted to the wireless device in the TTI n, where l is an uplink scheduling timing l and is a function of a configured TDD uplink/downlink configuration. The uplink scheduling timing l is a number of TTIs that is larger than or equal to a predefined minimum uplink scheduling timing value such that n+l is an uplink TTI and the predefined minimum uplink scheduling timing value is 2 or 3.

In some embodiments, the uplink scheduling timing l is a smallest integer number of TTIs that is larger than or equal to a predefined minimum uplink scheduling timing value such that n+l is an uplink TTI and the predefined minimum uplink scheduling timing value is 2 or 3.

In some embodiments, the uplink grant schedules multiple uplink TTIs for the same wireless device.

In some embodiments, the uplink grant comprises an indication of one or more uplink TTIs for which the uplink grant is valid.

In some embodiments, an uplink part of special SFs can be used for uplink data transmission, and the uplink scheduling timing l is determined in such a manner that the uplink part of the special SFs are treated as uplink TTIs. In some other embodiments, the uplink scheduling timing l is determined in such a manner that the uplink part of the special SFs are not treated as uplink TTIs.

In some embodiments, the configured TDD uplink/downlink configuration is LTE TDD uplink/downlink configuration 1, and the uplink scheduling timing l is 3 if n=0, the uplink scheduling timing l is 5 if n=1, the uplink scheduling timing l is 3 if n=4, the uplink scheduling timing l is 3 if n=5, the uplink scheduling timing l is 5 if n=6, and the uplink scheduling timing l is 3 if n=9.

In some embodiments, the configured TDD uplink/downlink configuration is LTE TDD uplink/downlink configuration 2, and the uplink scheduling timing l is 3 if n=3, the uplink scheduling timing l is 3 if n=4, the uplink scheduling timing l is 3 if n=8, and the uplink scheduling timing l is 3 if n=9.

In some embodiments, the configured TDD uplink/downlink configuration is LTE TDD uplink/downlink configuration 3, and the uplink scheduling timing l is 3 if n=0, the uplink scheduling timing l is 3 if n=1, the uplink scheduling timing l is 3 if n=8, and the uplink scheduling timing l is 3 if n=9.

In some embodiments, the configured TDD uplink/downlink configuration is LTE TDD uplink/downlink configuration 4, and the uplink scheduling timing l is 3 if n=0, the uplink scheduling timing l is 3 if n=8, and the uplink scheduling timing l is 3 if n=9.

In some embodiments, the configured TDD uplink/downlink configuration is LTE TDD uplink/downlink configuration 5, and the uplink scheduling timing l is 3 if n=8 and the uplink scheduling timing l is 3 if n=9.

In some embodiments, the uplink scheduling timing l is determined based on the configured TDD uplink/downlink configuration and a UI comprised in the uplink grant in the TTI n.

In some embodiments, the TTI n and the TTI n+l are 1 ms TTIs.

Embodiments of a radio access node for a cellular communications network are also disclosed. In some embodiments, a radio access node for a cellular communications network is adapted to transmit an uplink grant to a wireless device in a TTI n and receive, in a TTI n+l, an uplink transmission from the wireless device in accordance with the uplink grant transmitted to the wireless device in the TTI n, where l is an uplink scheduling timing and is a function of a configured TDD uplink/downlink configuration. The uplink scheduling timing l is a smallest integer number of TTIs that is larger than or equal to a predefined minimum uplink scheduling timing value such that n+l is an uplink TTI and the predefined minimum uplink scheduling timing value is 2 or 3.

In some embodiments, the radio access node is further adapted to perform the method of operation of a radio access node according to any other embodiments of the method of operation of a radio access node disclosed herein.

In some embodiments, a radio access node for a cellular communications network comprises at least one transmitter and at least one receiver, at least one processor, and memory comprising instructions executable by the at least one processor whereby the radio access node is operable to transmit an uplink grant to a wireless device in a TTI n and receive, in a TTI n+l, an uplink transmission from the wireless device in accordance with the uplink grant transmitted to the wireless device in the TTI n, where l is an uplink scheduling timing and is a function of a configured TDD uplink/downlink configuration. The uplink scheduling timing l is a smallest integer number of TTIs that is larger than or equal to a predefined minimum uplink scheduling timing value such that n+l is an uplink TTI and the predefined minimum uplink scheduling timing value is 2 or 3.

In some embodiments, a radio access node for a cellular communications network comprises a transmitting module and a receiving module. The transmitting module is operable to transmit an uplink grant to a wireless device in a TTI n. The receiving module is operable to receive, in a TTI n+l, an uplink transmission from the wireless device in accordance with the uplink grant transmitted to the wireless device in the TTI n, where l is an uplink scheduling timing and is a function of a configured TDD uplink/downlink configuration. The uplink scheduling timing l is a smallest integer number of TTIs that is larger than or equal to a predefined minimum uplink scheduling timing value such that n+l is an uplink TTI and the predefined minimum uplink scheduling timing value is 2 or 3.

Other embodiments of a method of operation of a wireless device in a cellular communications network are also disclosed. In some embodiments, a method of operation of a wireless device in a cellular communications network comprises receiving an uplink grant in a TTI n, determining an uplink scheduling timing l based on a configured TDD uplink/downlink configuration where the uplink scheduling timing l is a number of TTIs that is larger than or equal to a predefined minimum uplink scheduling timing value such that n+l is an uplink TTI, and transmitting, in a TTI n+l, an uplink transmission in accordance with the uplink grant received in the TTI n. An uplink part of special SFs can be used for uplink data transmission, and determining the uplink scheduling timing l comprises determining the uplink scheduling timing l in such a manner that the uplink part of the special SFs are treated as uplink TTIs.

In some embodiments, the predefined minimum uplink scheduling timing value is 2, 3, or 4. Further, in some embodiments, the uplink scheduling timing l is a smallest integer number of TTIs that is larger than or equal to the predefined minimum uplink scheduling timing value such that n+l is an uplink TTI.

In some embodiments, the uplink grant schedules multiple uplink TTIs for the same wireless device.

In some embodiments, the uplink grant comprises an indication of one or more uplink TTIs for which the uplink grant is valid.

In some embodiments, determining the uplink scheduling timing l comprises determining the uplink scheduling timing l based on the configured TDD uplink/downlink configuration and a UI comprised in the uplink grant received in the TTI n.

In some embodiments, the TTI n and the TTI n+l are 1 ms TTIs.

Other embodiments of a wireless device for a cellular communications network are also disclosed. In some embodiments, a wireless device for a cellular communications network is adapted to receive an uplink grant in a TTI n, determine an uplink scheduling timing l based on a configured TDD uplink/downlink configuration where the uplink scheduling timing l is a number of TTIs that is larger than or equal to a predefined minimum uplink scheduling timing value such that n+l is an uplink TTI, and transmit, in a TTI n+l, an uplink transmission in accordance with the uplink grant received in the TTI n. An uplink part of special SFs can be used for uplink data transmission, and the wireless device determines the uplink scheduling timing l in such a manner that the uplink part of the special SFs are treated as uplink TTIs.

In some embodiments, the wireless device is further adapted to perform the method of operation of a wireless device according to any other embodiments of the method of operation of a wireless device disclosed herein.

In some embodiments, a wireless device for a cellular communications network comprises at least one transceiver, at least one processor, and memory comprising instructions executable by the at least one processor whereby the wireless device is operable to receive an uplink grant in a TTI n, determine an uplink scheduling timing l based on a configured TDD uplink/downlink configuration where the uplink scheduling timing l is a number of TTIs that is larger than or equal to a predefined minimum uplink scheduling timing value such that n+l is an uplink TTI, and transmit, in a TTI n+l, an uplink transmission in accordance with the uplink grant received in the TTI n. An uplink part of special SFs can be used for uplink data transmission, and the wireless device is operable to determine the uplink scheduling timing l in such a manner that the uplink part of the special SFs are treated as uplink TTIs.

In some embodiments, a wireless device for a cellular communications network comprises a receiving module, a determining module, and a transmitting module. The receiving module is operable to receive an uplink grant in a TTI n. The determining module is operable to determine an uplink scheduling timing l based on a configured TDD uplink/downlink configuration, the uplink scheduling timing l being a number of TTIs that is larger than or equal to a predefined minimum uplink scheduling timing value such that n+l is an uplink TTI. The transmitting module is operable to transmit, in a TTI n+l, an uplink transmission in accordance with the uplink grant received in the TTI n. An uplink part of special SFs can be used for uplink data transmission, and the wireless device determines the uplink scheduling timing l in such a manner that the uplink part of the special SFs are treated as uplink TTIs.

Other embodiments of method of operation of a radio access node in a cellular communications network are also disclosed. In some embodiments, a method of operation of a radio access node in a cellular communications network comprises transmitting an uplink grant to a wireless device in a TTI n and receiving, in a TTI n+l, an uplink transmission from the wireless device in accordance with the uplink grant transmitted to the wireless device in the TTI n, where l is an uplink scheduling timing and the uplink scheduling timing l is a number of TTIs that is larger than or equal to a predefined minimum uplink scheduling timing value such that n+l is an uplink TTI. An uplink part of special SFs can be used for uplink data transmission, and the uplink scheduling timing l is determined in such a manner that the uplink part of the special SFs are treated as uplink TTIs.

In some embodiments, the predefined minimum uplink scheduling timing value is 2, 3, or 4. Further, in some embodiments, the uplink scheduling timing l is a smallest integer number of TTIs that is larger than or equal to the predefined minimum uplink scheduling timing value such that n+l is an uplink TTI.

In some embodiments, the uplink grant schedules multiple uplink TTIs for the same wireless device.

In some embodiments, the uplink grant comprises an indication of one or more uplink TTIs for which the uplink grant is valid.

In some embodiments, the uplink scheduling timing l is determined based on a configured TDD uplink/downlink configuration and a UI comprised in the uplink grant in the TTI n.

In some embodiments, the TTI n and the TTI n+l are 1 ms TTIs.

Other embodiments of a radio access node for a cellular communications network are also disclosed. In some embodiments, a radio access node for a cellular communications network is adapted to transmit an uplink grant to a wireless device in a TTI n and receive, in a TTI n+l, an uplink transmission from the wireless device in accordance with the uplink grant transmitted to the wireless device in the TTI n, where l is an uplink scheduling timing and the uplink scheduling timing l is a number of TTIs that is larger than or equal to a predefined minimum uplink scheduling timing value such that n+l is an uplink TTI and is a function of a configured TDD uplink/downlink configuration. An uplink part of special SFs can be used for uplink data transmission, and the uplink scheduling timing l is determined in such a manner that the uplink part of the special SFs are treated as uplink TTIs.

In some embodiments, the radio access node is further adapted to perform the method of operation of a radio access node according to any other embodiments of the method of operation of a radio access node disclosed herein.

In some embodiments, a radio access node for a cellular communications network comprises at least one transmitter and at least one receiver, at least one processor, and memory comprising instructions executable by the at least one processor whereby the radio access node is operable to transmit an uplink grant to a wireless device in a TTI n and receive, in a TTI n+l, an uplink transmission from the wireless device in accordance with the uplink grant transmitted to the wireless device in the TTI n, where l is an uplink scheduling timing and the uplink scheduling timing l is a number of TTIs that is larger than or equal to a predefined minimum uplink scheduling timing value such that n+l is an uplink TTI and is a function of a configured TDD uplink/downlink configuration. An uplink part of special SFs can be used for uplink data transmission, and the uplink scheduling timing l is determined in such a manner that the uplink part of the special SFs are treated as uplink TTIs.

In some embodiments, a radio access node for a cellular communications network comprises a transmitting module and a receiving module. The transmitting module is operable to transmit an uplink grant to a wireless device in a TTI n. The receiving module is operable to receive, in a TTI n+l, an uplink transmission from the wireless device in accordance with the uplink grant transmitted to the wireless device in the TTI n, where l is an uplink scheduling timing and the uplink scheduling timing l is a number of TTIs that is larger than or equal to a predefined minimum uplink scheduling timing value such that n+l is an uplink TTI and is a function of a configured TDD uplink/downlink configuration. An uplink part of special SFs can be used for uplink data transmission, and the uplink scheduling timing l is determined in such a manner that the uplink part of the special SFs are treated as uplink TTIs.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 6 through 8 illustrate scheduling timing for TDD uplink/downlink configuration 1 according to some embodiments of the present disclosure;

FIGS. 19 through 23 illustrate scheduling timing for TDD uplink/downlink configuration 6 according to some embodiments of the present disclosure;

DETAILED DESCRIPTION

Figure 1:
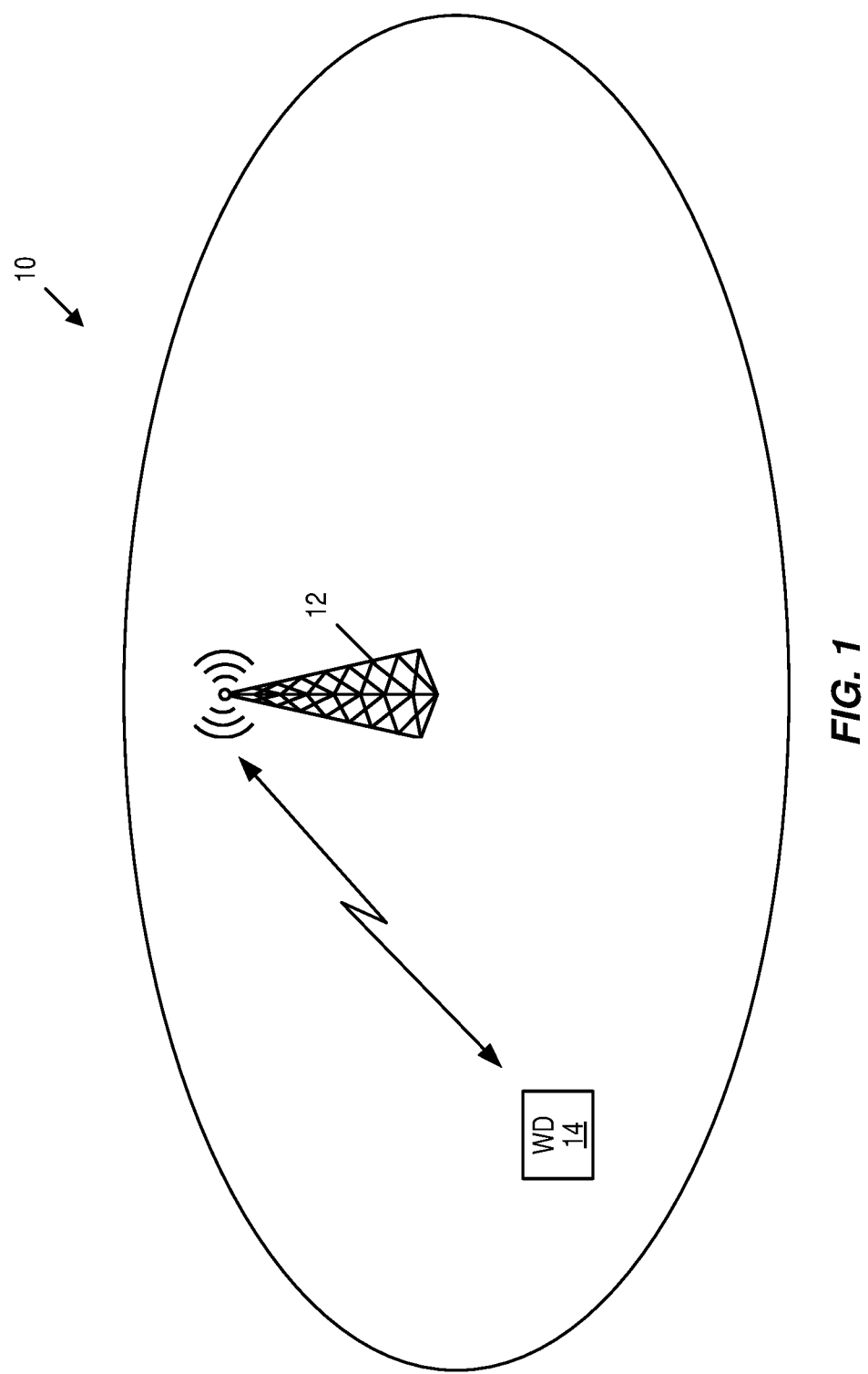
FIG. 1 illustrates one example of a cellular communications network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Radio Node: As used herein, a "radio node" is either a radio access node or a wireless device.

Radio Access Node: As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a Core Network (CN). Some examples of a core network node include, e.g., a Mobility Management Entity (MME), a Packet Data Network (PDN) Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the CN of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to Fifth Generation (5G) concepts, beams may be used instead of cells and, as such, it is important to note that the concepts described herein are equally applicable to both cells and beams.

For LTE Release 15, it has been agreed to reduce processing time to allow for shorter latency. UE capabilities have improved and a faster processing time can be expected nowadays compared to what could be done in the first release of LTE. With reduced processing time, the inventors envision that the downlink Hybrid Automatic Repeat Request (HARQ) timing will be chosen between n+2 or n+3. Similarly with reduced processing time, the inventors envision that the uplink scheduling timing (uplink grant to uplink data delay) will be chosen between n+2 or n+3. The tables in the LTE specifications that give the uplink scheduling timing for Time Division Duplexing (TDD) do not capture the processing time reduction for uplink grant to uplink data. These tables need to be modified to achieve lower latency.

Moreover, by introducing data transmission in Uplink Part of a Special Subframe (UpPTS), it becomes possible to transmit Physical Uplink Shared Channel (PUSCH) within the special Subframes (SFs). This implies that uplink scheduling timing needs to be defined for uplink transmissions occurring in UpPTS.

Two different methods, i.e., latency optimized and load balancing, are proposed for the design of new Uplink Index (UI) scheduling timing tables for supporting reduced processing time with 1 millisecond (ms) Transmission Time Interval (TTI) operations in TDD.

For the latency optimized approach, the uplink scheduling grant sent in TTI n is valid for TTI n+l, where l is the smallest value larger than or equal to a predefined minimum timing (e.g., 2 or 3 ms) such that n+l is an uplink TTI.

For the load balancing approach, the uplink scheduling assignments are equally distributed over different downlink TTIs.

Methods for designing uplink scheduling timing with uplink data transmission on UpPTS are proposed.

The proposed solution provides new uplink scheduling timing tables to enable reduced processing time with 1 ms TTI in TDD. The latency optimized solution can offer the largest latency reduction gain. On the other hand, the load balancing based solution can simplify the control design, with reduced control signaling overhead.

FIG. 1 illustrates one example of a cellular communications network 10 in which embodiments of the present disclosure may be implemented. As illustrated, the cellular communications network 10 includes a radio access node 12 (e.g., a base station or eNB) and a wireless device 14. In the embodiments described herein, the radio access node 12 and the wireless device 14 operate according to a TDD scheme in which some SFs are downlink SFs, some SFs are uplink SFs, and some SFs are special SFs. Embodiments of the present disclosure relate to uplink scheduling timing for 1 ms TTI operations in TDD.

Two different methods, i.e., latency optimized and load balancing, are proposed for the design of a new uplink scheduling timing table for supporting reduced processing time with 1 ms TTI operations in TDD.

It is further understood that the timing designs can be extended to support Carrier Aggregation (CA) with both Frequency Division Duplexing (FDD) and TDD carriers, among different TDD carriers and also among Frame Structure (FS) type 3 (FS3) carriers and TDD carriers. The timing relations that will be used are formed from the design provided in the present disclosure and extends the CA design.

In one embodiment, the timing relations are designed based on the latency optimized approach; that is, the uplink scheduling grant sent in TTI n is valid for TTI n+l, where l is the smallest value larger than or equal to a predefined minimum timing such that n+l is an uplink TTI. As described herein, the predefined minimum timing is 2 in some embodiments and 3 in some other embodiments.

In another embodiment, the timing relations are designed based on the load balancing approach; that is, the uplink scheduling assignments are equally distributed over different downlink TTIs.

In one embodiment, the timing relations for different downlink/uplink configurations are designed based on different approaches, i.e., some downlink/uplink configurations are designed based on the latency optimization approach while the other downlink/uplink configurations are designed based on the load balancing approach.

In one embodiment, if multiple uplink TTIs need to be scheduled in one downlink TTI, then the same UE is scheduled on all these uplink TTIs based on the same uplink Downlink Control Information (DCI), such that only one uplink scheduling grant needs to be sent from the downlink TTI.

In another embodiment, if multiple uplink TTIs need to be scheduled in one downlink TTI, then a field in the uplink DCI, e.g., a UI field, is used to signal for which uplink TTI(s) the grant is valid. If a load balancing approach is adopted to spread out the uplink grants, it can done so to consider to limit the number of bits in the uplink field, e.g. to 2 bits.

In one embodiment, UpPTS of the special SFs can be used for uplink data transmission, and the uplink scheduling timing for all uplink TTI transmissions are designed based on either the latency optimized approach or the load balancing approach, by treating UpPTS as an uplink TTI, i.e., by taking the scheduling of uplink data transmission in UpPTS into account.

In another embodiment, UpPTS of the special SFs can be used for uplink data transmission, and the uplink scheduling timing for all uplink TTI transmissions within legacy uplink SFs are firstly designed based on either the latency optimized approach or the load balancing approach, by not taking scheduling of data transmission in UpPTS into account; then, the uplink scheduling timing for data transmission in TTI(s), which consist(s) of UpPTS, is added on top of the latency optimized approach or the load balancing approach.

Figure 2:
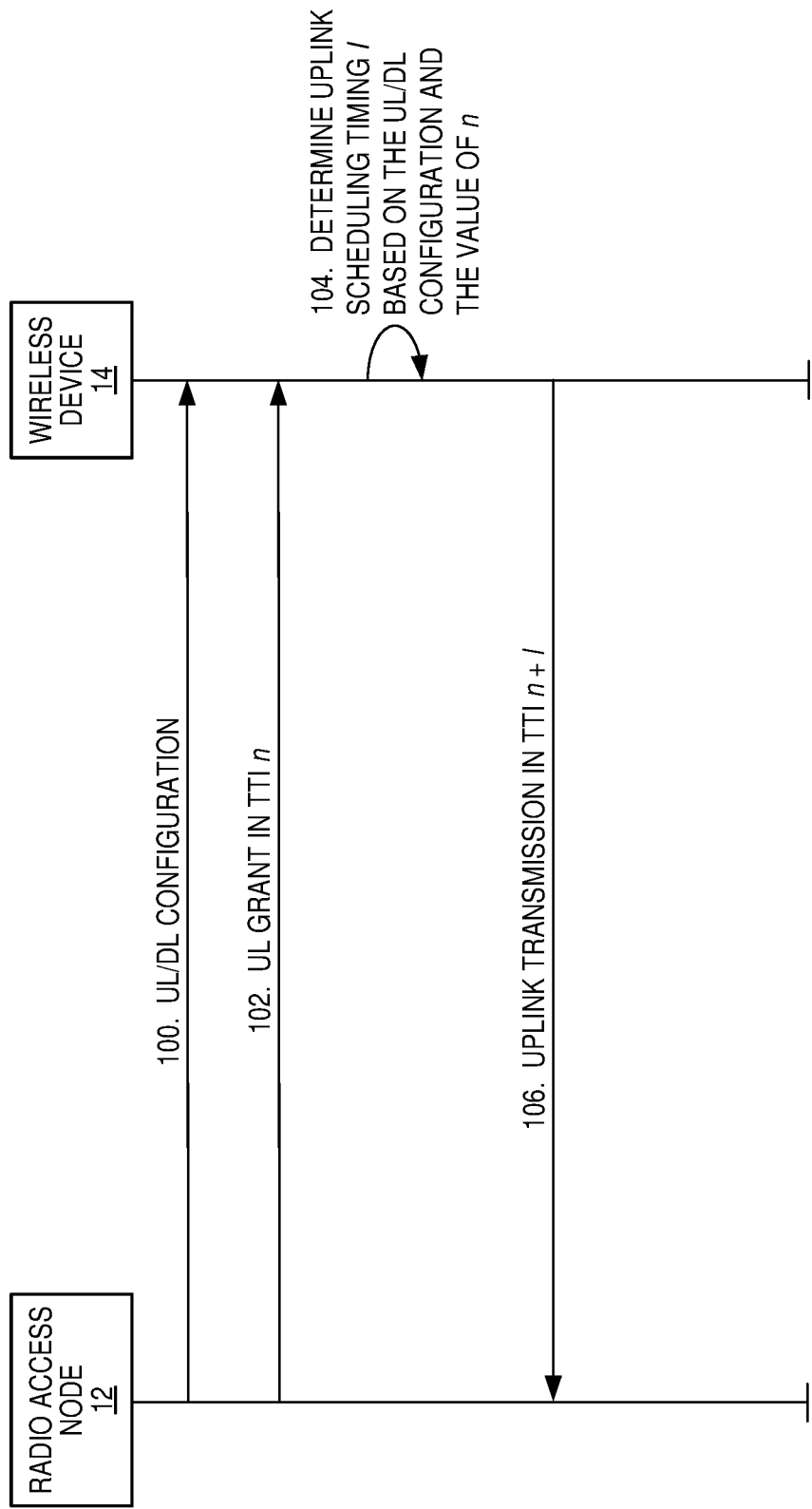
FIG. 2 illustrates the operation of the radio access node and the wireless device of FIG. 1 according to some embodiments of the present disclosure.

In this regard, FIG. 2 illustrates the operation of the radio access node 12 and the wireless device 14 according to some embodiments of the present disclosure. As illustrated, the radio access node 12 transmits (e.g., broadcasts) an uplink/downlink (UL/DL) configuration (step 100). At some point, the radio access node 12 transmits an uplink grant to the wireless device 14 in TTI n (step 102). Based on the uplink/downlink configuration and the value of n, the wireless device 14 determines an uplink timing l for transmitting an uplink transmission to the radio access node 12 in accordance with the uplink grant (step 104). As described herein, the uplink timing l is an integer value larger than or equal to a predefined minimum timing such that TTI n+l is an uplink TTI. In some embodiments, the predefined minimum timing is 2. In some other embodiments, the predefined minimum timing is 3. In some other embodiments, the predefined minimum timing is 4.

As described herein, in some embodiments, the UpPTS can be used for uplink data transmission, and the wireless device 14 determines the uplink scheduling timing l in such a manner that the UpPTSs are treated as uplink TTIs. Further, in some embodiments, the predefined minimum timing is 2, 3, or 4, depending on the particular embodiment.

As also described herein, in some other embodiments, the UpPTS cannot be used for uplink data transmission, and the wireless device 14 determines the uplink scheduling timing l in such a manner that the UpPTSs are not treated as uplink TTIs. Further, in some embodiments, the predefined minimum timing is 2 or 3, depending on the particular embodiment.

As discussed herein, in some embodiments, the wireless device 14 determines the uplink timing l based on predefined tables (e.g., tables specified in a standard). As an example, the uplink timing l may be determined using the tables defined below. In some embodiments, the uplink timing l is defined in accordance with a latency optimization approach. For the latency optimized approach, the uplink timing l is the smallest value larger than or equal to a predefined minimum timing such that TTI n+l is an uplink TTI. In other embodiments, the uplink timing l is defined in accordance with a load balancing approach. Notably, as discussed above, in some embodiments, if multiple uplink TTIs need to be scheduled in one downlink TTI, then the same wireless device 12 is scheduled on all of these uplink TTIs, e.g., based on the same uplink DCI such that only one uplink scheduling grant is sent in the downlink TTI. In other embodiments, if multiple uplink TTIs need to be scheduled in one downlink TTI, then a field in the uplink DCI, e.g., a UI field, is used to signal for which uplink TTI(s) the grant is valid. If a load balancing approach is adopted to spread out the uplink grants, it can done so to consider to limit the number of bits in the uplink field, e.g. to 2 bits. Further, in some embodiments, the uplink timing l is determined (e.g., the predefined tables are defined) such that the UpPTS of the special SFs are treated as uplink TTIs. In a similar manner, the radio access node 12 knows the uplink timing l such that the radio access node 12 knows when to expect the respective uplink transmission from the wireless device 14. The wireless device 14 transmits, and the radio access node 12 receives, the uplink transmission in TTI n+l (step 106).

In the following, deriving the uplink scheduling timing tables for reduced processing time and 1 ms TTI for different downlink/uplink configurations is shown. The uplink scheduling grant sent in TTI n is valid for TTI n+l, where l is the smallest value larger than or equal to a predefined minimum uplink timing ($k_0$) such that n+l is an uplink TTI. In the following the uplink scheduling timing for different $k_0$ are given. In certain cases, only the uplink scheduling timing for $k_0$=3 is given but the same methodology can be applied for other values of $k_0$.

Figure 3:
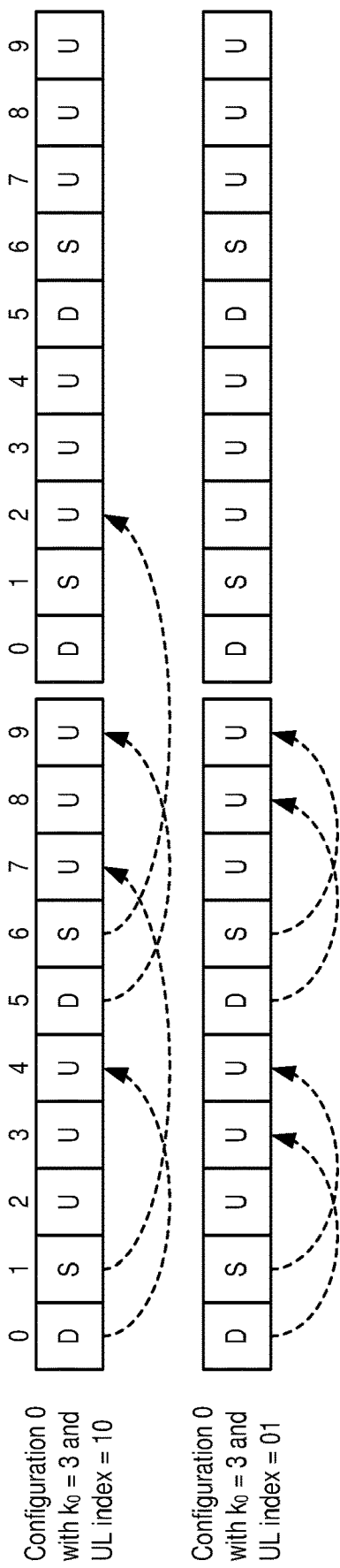
FIGS. 3 through 5 illustrate scheduling timing for Time Division Duplexing (TDD) uplink/downlink configuration 0 according to some embodiments of the present disclosure.
Figure 4:
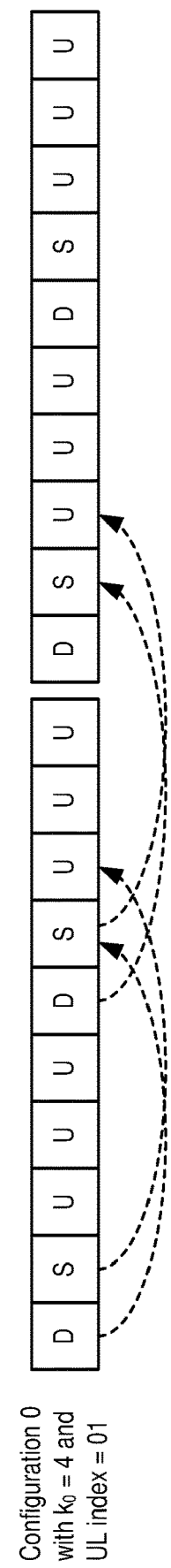
Figure 5:
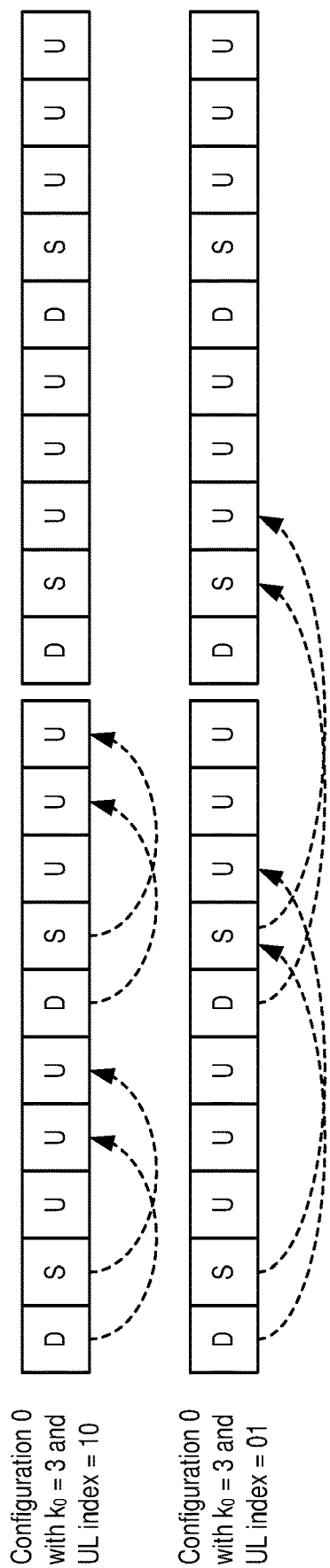

FIGS. 3 to 5 show the scheduling timing for TDD uplink/downlink configuration 0 with and without PUSCH in UpPTS. The uplink scheduling timing is the same for the latency optimized approach and the load balancing approach. Since there are more uplink SFs to schedule than there are downlink SFs for sending the uplink grant, a downlink SF needs to schedule multiple uplink SFs. This can be done by including a field with, for instance, two bits in the uplink grant that would indicate which uplink SFs are scheduled from the same uplink grant/downlink SF. The existing uplink index in the uplink grant can be used for that purpose in this case too. Another solution for handling this multi-UE scheduling issue is to schedule the same UE to all these multiple uplink SFs by using the same uplink DCI.

FIGS. 3 to 5 show the case where the UI is 10 and 01 in the uplink grant. In the case where the UI is set to 11, the two uplink SFs indicated separately with 10 and 01 are scheduled. An example based on FIG. 3: if the uplink grant in the first downlink SF contains a field UI set to 11, both the uplink SFs 3 and 4 are scheduled.

Figure 6:
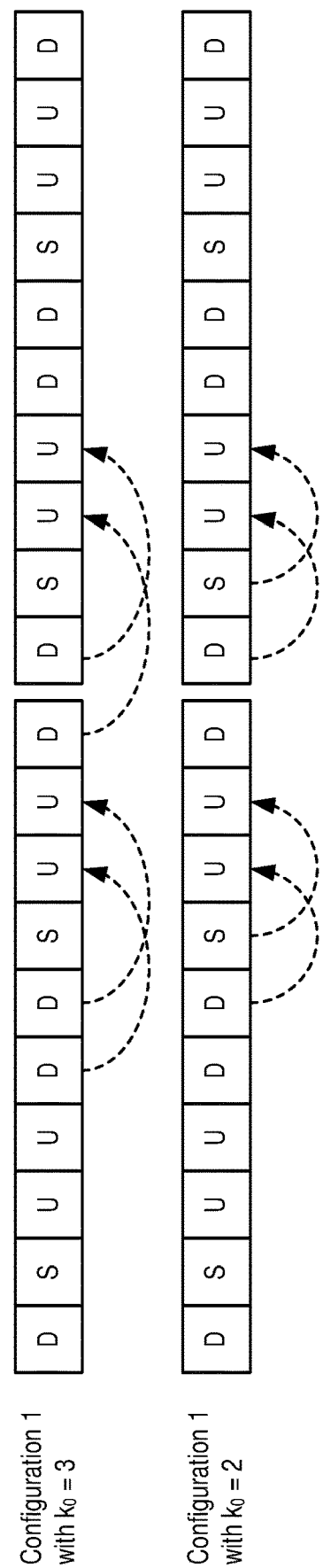

FIGS. 6 to 8 show the scheduling timing for TDD uplink/downlink configuration 1 with and without PUSCH in UpPTS. The uplink scheduling timing is the same for the latency optimized approach and the load balancing approach in case of $k_0$=2 or 3 ms.

In case of PUSCH in UpPTS and $k_0$=4 ms, the latency-optimized approach leads to the situation where a downlink SF (or Downlink Part of a Special Subframe (DwPTS) of the special SF) contains the uplink grant for both UpPTS and the next uplink SF. This means that the downlink SF contains a field with two bits (similar to the UI mentioned earlier) in the uplink grant to indicate which uplink SF(s) is scheduled. The load balancing approach or the case of PUSCH in UpPTS and $k_0$=4 ms does not lead to this situation but the average delay between the uplink grant to uplink data is increased by 7% compared to the latency-optimized approach. Considering this small difference in the delay, the load balancing approach appears more attractive for this configuration.

Another solution for handling the multi-UE scheduling issue when using the latency-optimized approach is to schedule the same UE to all these multiple uplink SFs by using the same uplink DCI.

Figure 9:
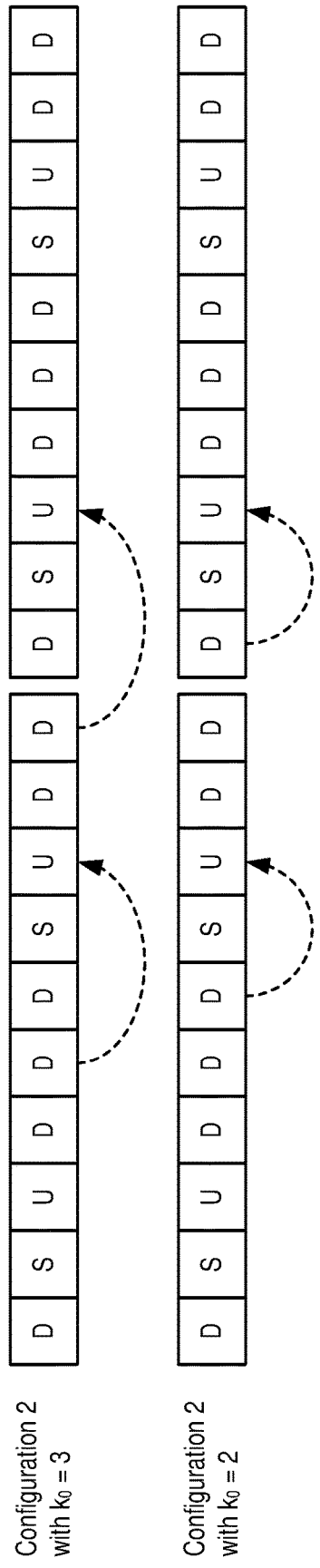
FIGS. 9 and 10 illustrate scheduling timing for TDD uplink/downlink configuration 2 according to some embodiments of the present disclosure.
Figure 10:
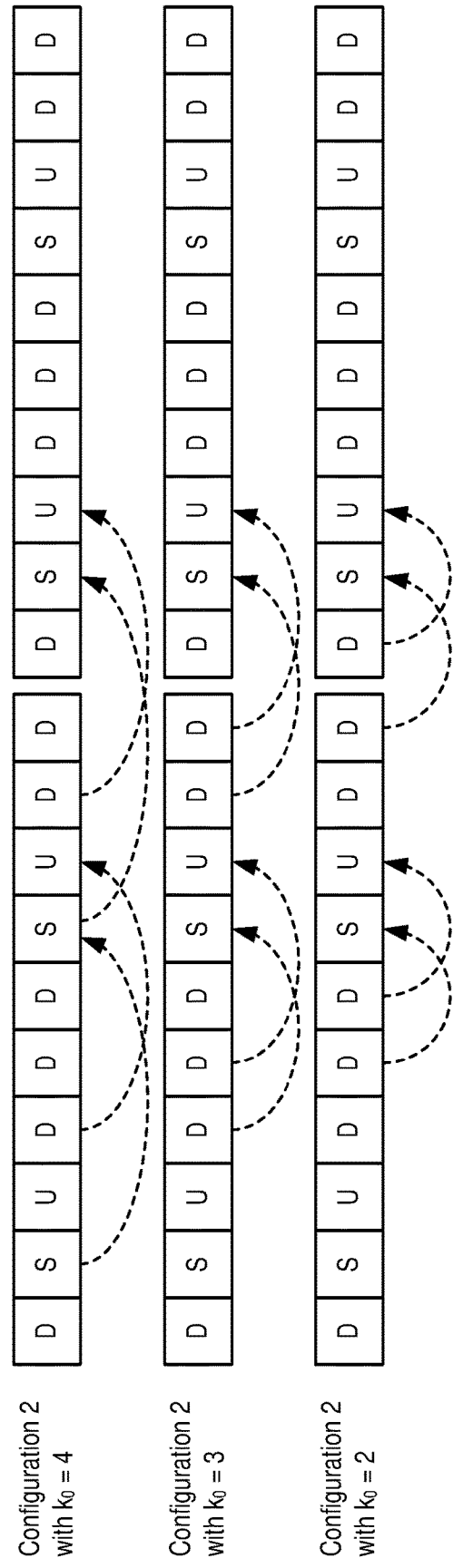
Figure 11:
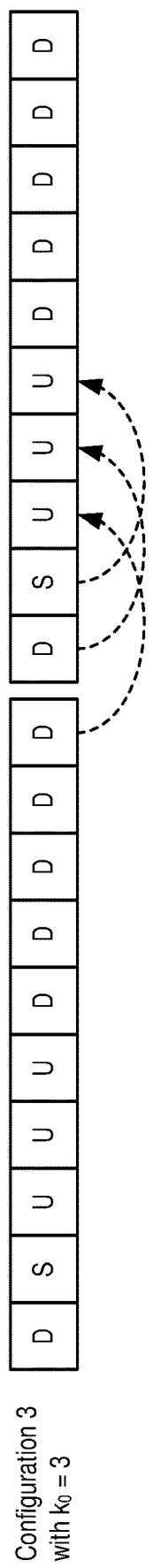
FIGS. 11 through 14 illustrate scheduling timing for TDD uplink/downlink configuration 3 according to some embodiments of the present disclosure.

FIGS. 9 and 10 show the scheduling timing for TDD uplink/downlink configuration 2 with and without PUSCH in UpPTS. The uplink scheduling timing is the same for the latency optimized approach and the load balancing approach.

FIGS. 11 to 14 show the scheduling timing for TDD uplink/downlink configuration 3 with and without PUSCH in UpPTS. The uplink scheduling timing is the same for the latency optimized approach and the load balancing approach in case of $k_0=4$ or 3 ms.

Figure 12:
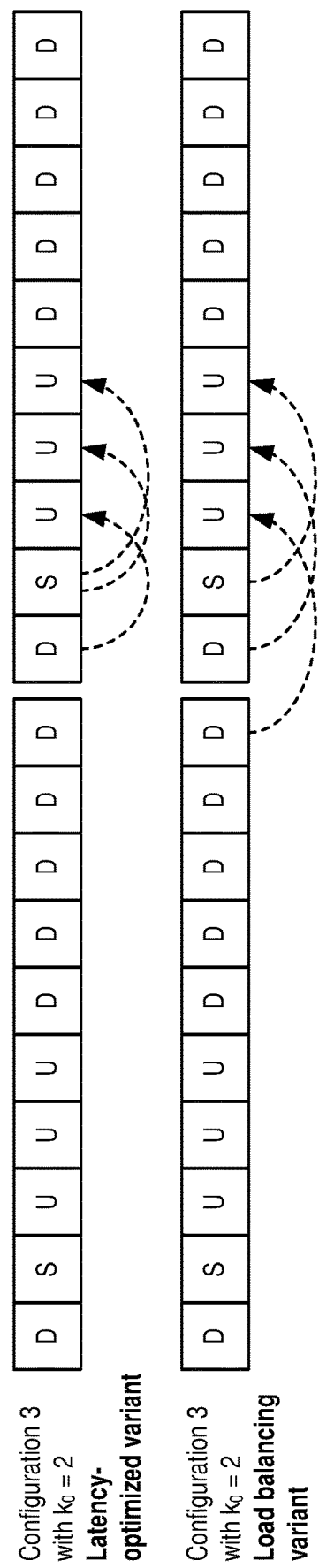
Figure 13:
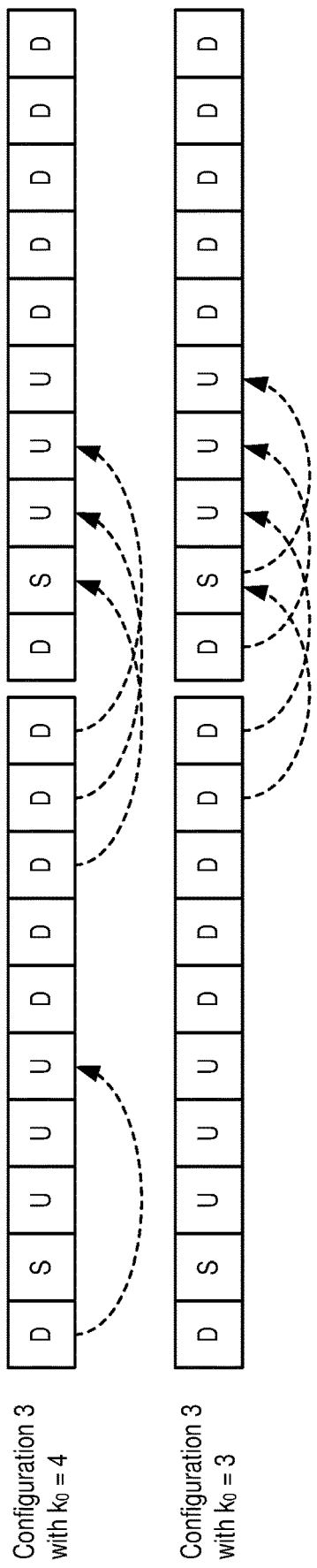
Figure 14:
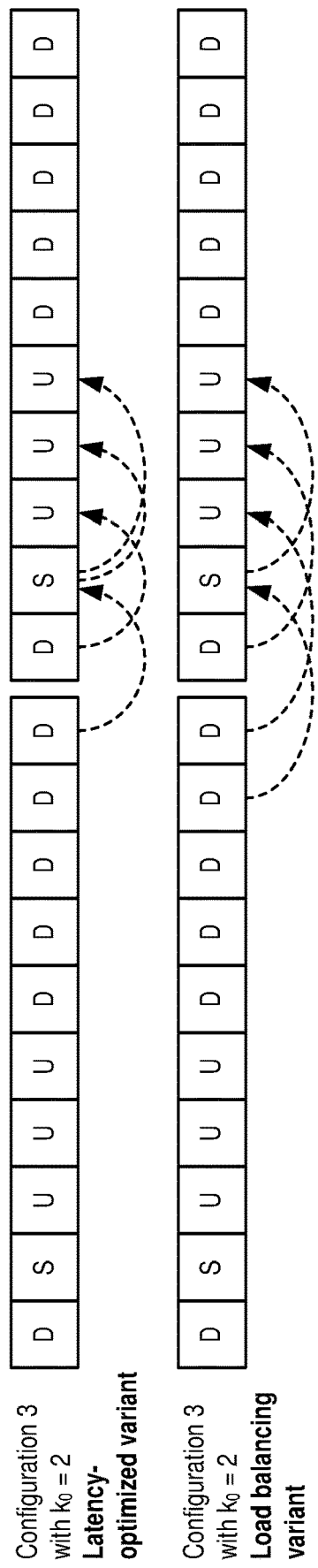

In case of PUSCH in UpPTS and $k_0=2$ ms, the latency-optimized approach leads to the situation where a downlink SF (or downlink part of the special SF) contains the uplink grant for two uplink SFs (see FIG. 12 and FIG. 14). This means that the downlink SF contains a field with two bits (similar to the UI mentioned earlier) in the uplink grant to indicate which uplink SF(s) is scheduled. The load balancing approach or the case of PUSCH in UpPTS and $k_0=4$ ms does not lead to this situation but the average delay between the uplink grant to uplink data is longer compared to the latency-optimized approach.

Figure 15:
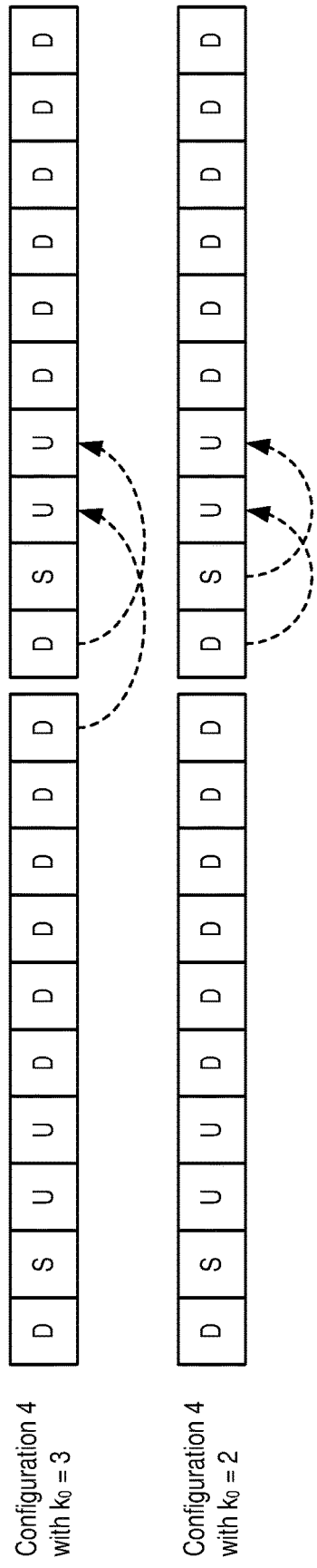
FIGS. 15 and 16 illustrate scheduling timing for TDD uplink/downlink configuration 4 according to some embodiments of the present disclosure.
Figure 16:
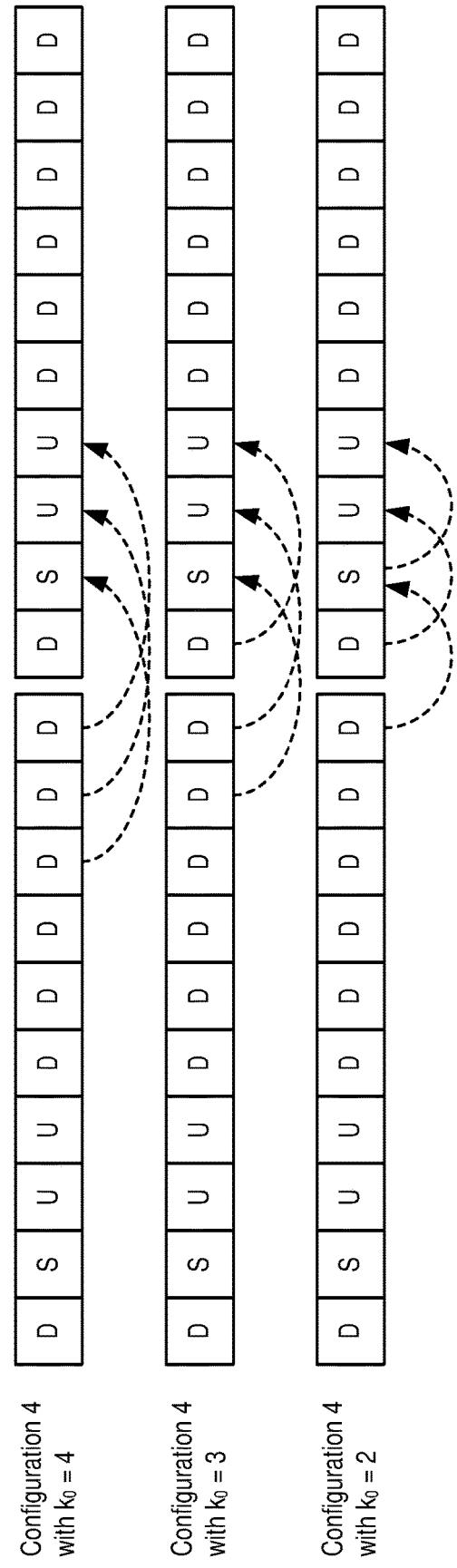

FIGS. 15 and 16 show the scheduling timing for TDD uplink/downlink configuration 4 with and without PUSCH in UpPTS. The uplink scheduling timing is the same for the latency optimized approach and the load balancing approach.

Figure 17:
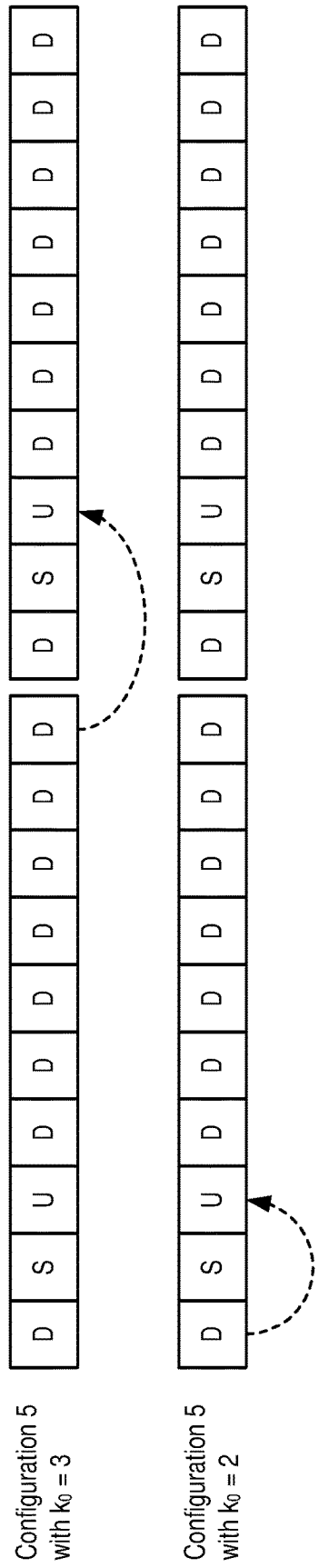
FIGS. 17 and 18 illustrate scheduling timing for TDD uplink/downlink configuration 5 according to some embodiments of the present disclosure.
Figure 18:
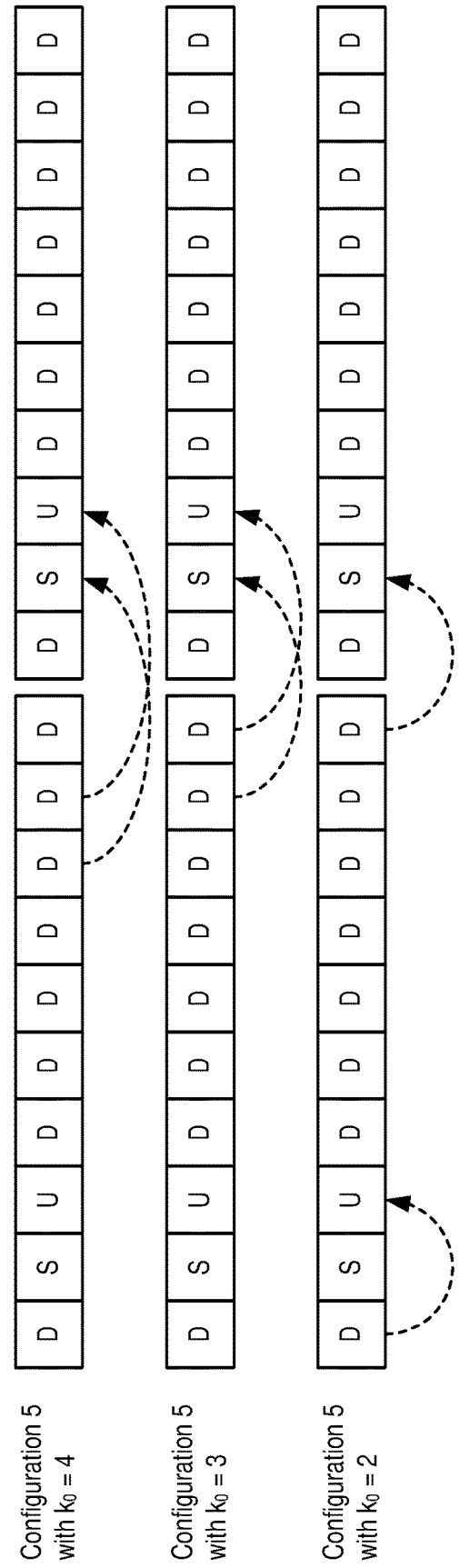
Figure 21:
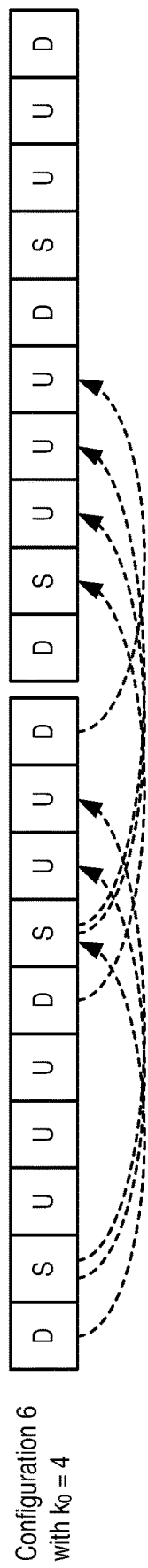
Figure 22:
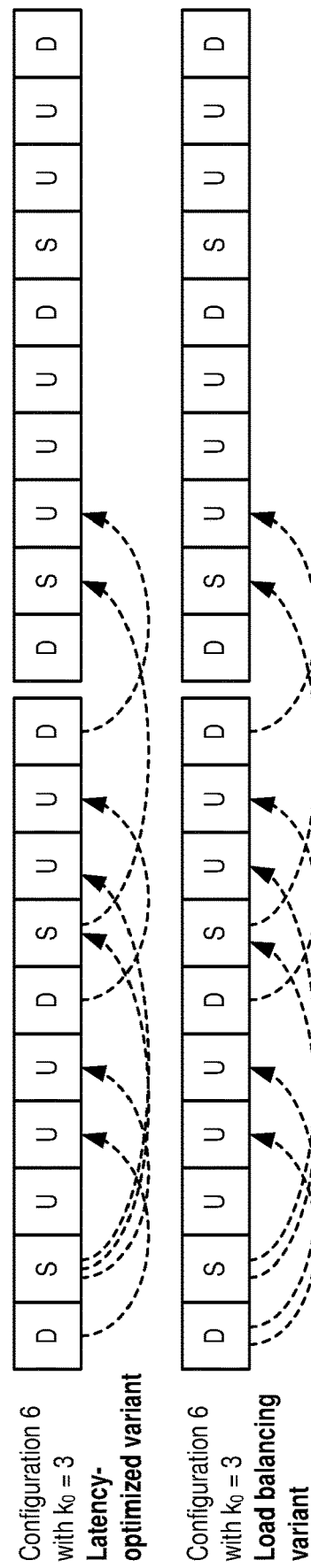
Figure 23:
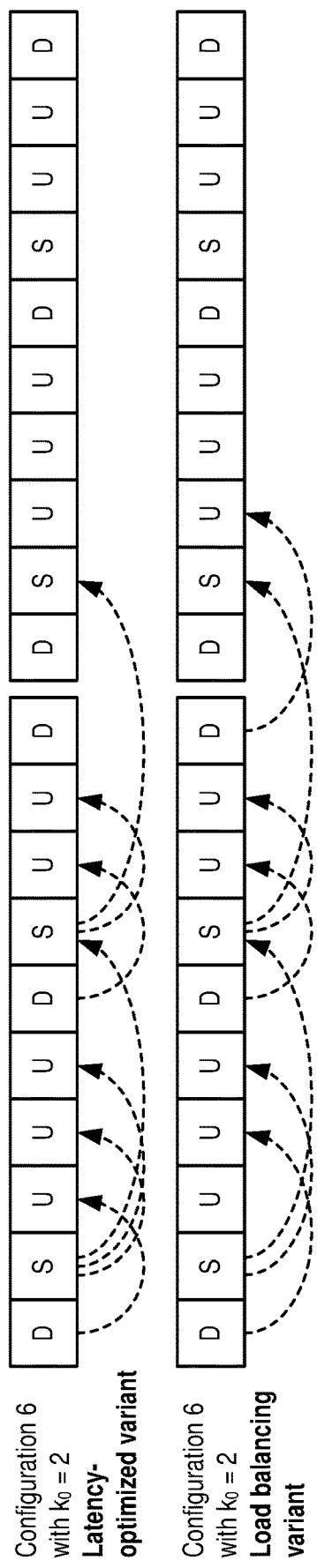

FIGS. 17 and 18 show the scheduling timing for TDD uplink/downlink configuration 5 with and without PUSCH in UpPTS. The uplink scheduling timing is the same for the latency optimized approach and the load balancing approach.

FIGS. 19 to 23 show the scheduling timing for TDD uplink/downlink configuration 6 with and without PUSCH in UpPTS. The uplink scheduling timing is the same for the latency optimized approach and the load balancing approach in case of $k_0=4$ and PUSCH in UpPTS.

In case of no PUSCH in UpPTS and $k_0=2$ or 3 ms, the latency-optimized approach leads to the situation where a downlink SF (or downlink part of the special SF) contains the uplink grant for two uplink SFs (see FIG. 19). This means that the uplink grant sent in the downlink SFs contains a field with two bits (similar to the UI mentioned earlier) to indicate which uplink SF(s) is scheduled. The load balancing approach does not lead to this situation but the average delay between the uplink grant to uplink data is increased by 28% compared to the latency-optimized approach. In that case the latency-optimized approach appears more attractive at the cost of some higher control payload (two additional bits in the uplink grant or separate uplink grants). Another solution for handling this multi-UE scheduling issue is to schedule the same UE to all these multiple uplink SFs by using the same uplink DCI.

In case of PUSCH in UpPTS and $k_0=2$ or 3 ms, the multi-uplink scheduling issue cannot be avoided even with the load balancing approach. In this case, a field similar to UI must be used to indicate the scheduled uplink SF(s), unless these uplink SFs are scheduled to the same UE by using the same DCI.

In the following description, the uplink scheduling timing for different downlink/uplink configurations are summarized into tables. Note that, for all examples shown in this section, it is assumed that the minimum uplink scheduling timing is three times of the TTI length ($k_0=3$). The tables will look different when the minimum timing is different. However, in that case the tables can be created from the figures in the previous section that cover $k_0=2$ or $k_0=4$.

Assuming that UpPTS does not contain PUSCH, Tables 6 and 7 give the corresponding uplink scheduling timing for 1 ms TTI and $k_0=3$.

For TDD uplink/downlink configurations 1-6, the UE shall, upon detection of a Physical Downlink Control Channel (PDCCH)/Enhanced PDCCH (EPDCCH) with uplink DCI format in SF n intended for the UE, adjust the corresponding PUSCH transmission in SF n+k, with k given in Table 6 if the latency-optimized approach is chosen or Table 7 if the load balancing approach is chosen.

For TDD uplink/downlink configuration 0 the UE shall adjust the corresponding PUSCH transmission in SF n+k if the first bit of the UI in the uplink grant is set to 1 with k given in Table 6 if the latency-optimized approach is chosen or Table 7 if the load balancing approach is chosen. If the second bit of the UI in the uplink grant is set to 1 in SF n, the UE shall adjust the corresponding PUSCH transmission in SF n+3. If the UI in the uplink grant sent in SF n is set to 11, the UE shall adjust the corresponding PUSCH transmission in both SFs n+k and n+3, with k given in Table 6 if the latency-optimized approach is chosen or Table 7 if the load balancing approach is chosen. Note that the exact same behaviour can be achieved by swapping the role of the first bit of the UI and the role of the second bit.

TABLE 6

Uplink Scheduling Timing for TDD with 1 ms TTI and Reduced Processing Time
$k_0 = 3$ (Latency Optimized, No PUSCH in UpPTS)

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | 3 | | | | 3 | 3 | | | | 3 |
| 2 | | | | | 3 | | | | | 3 |
| 3 | 3 | 3 | | | | | | | | 3 |
| 4 | 3 | | | | | | | | | 3 |
| 5 | | | | | | | | | | 3 |
| 6 | 3 | 3, 6 | | | | 3 | | | | 3 |

TABLE 7

Uplink Scheduling Timing for TDD with 1 ms TTI and Reduced Processing Time
$k_0 = 3$ (Load Balancing Approach, No PUSCH in UpPTS)

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | 3 | | | | 3 | 3 | | | | 3 |
| 2 | | | | | 3 | | | | | 3 |
| 3 | 3 | 3 | | | | | | | | 3 |
| 4 | 3 | | | | | | | | | 3 |
| 5 | | | | | | | | | | 3 |
| 6 | 4 | 6 | | | | 3 | 6 | | | 4 |

Assuming that UpPTS contains PUSCH, Table 8 and Table 9 give the corresponding uplink scheduling timing for 1 ms TTI and $k_0=3$.

The UE shall upon detection of a PDCCH/EPDCCH with uplink DCI format in SF n intended for the UE, adjust the corresponding PUSCH transmission in SF n+k, with k given in Table 8 if the latency-optimized approach is chosen or Table 9 if the load balancing approach is chosen.

For configuration 0 and 6, a field is added in the uplink DCI to indicate which of the multiple possible SFs is scheduled to the UE.

TABLE 8

Uplink Scheduling Timing for TDD with 1 ms TTI and Reduced Processing Time
$k_0 = 3$ (Latency Optimized, PUSCH in UpPTS)

| TDD UL/DL Configuration | subframe number n | | | | | | | | | |
|---|---|---|---|---|---|---|---|---|---|---|
|  | 0 | 1 | 2 | 3 | 4 | 5 | 6 | 7 | 8 | 9 |
| 0 | 3, 6 | 3, 6 |  |  |  | 3, 6 | 3, 6 |  |  |  |
| 1 | 3 | 5 |  |  | 3 | 3 | 5 |  |  | 3 |
| 2 |  |  |  | 3 | 3 |  |  |  | 3 | 3 |
| 3 | 3 | 3 |  |  |  |  |  |  | 3 | 3 |
| 4 | 3 |  |  |  |  |  |  |  | 3 | 3 |
| 5 |  |  |  |  |  |  |  |  | 3 | 3 |
| 6 | 3 | 3, 5, 6 |  |  |  | 3 | 5 |  |  | 3 |

TABLE 9

Uplink Scheduling Timing for TDD with 1 ms TTI and Reduced Processing Time
$k_0 = 3$ (Load Balancing Approach, PUSCH in UpPTS)

| TDD UL/DL Configuration | subframe number n | | | | | | | | | |
|---|---|---|---|---|---|---|---|---|---|---|
|  | 0 | 1 | 2 | 3 | 4 | 5 | 6 | 7 | 8 | 9 |
| 0 | 3, 6 | 3, 6 |  |  |  | 3, 6 | 3, 6 |  |  |  |
| 1 | 3 | 5 |  |  | 3 | 3 | 5 |  |  | 3 |
| 2 |  |  |  | 3 | 3 |  |  |  | 3 | 3 |
| 3 | 3 | 3 |  |  |  |  |  |  | 3 | 3 |
| 4 | 3 |  |  |  |  |  |  |  | 3 | 3 |
| 5 |  |  |  |  |  |  |  |  | 3 | 3 |
| 6 | 3, 4 | 5, 6 |  |  |  | 3 | 5 |  |  | 3 |

Two different methods, i.e., latency optimized and load balancing, are proposed for the design of new uplink scheduling timing tables for supporting 1 ms TTI operations with reduced processing time in TDD.

Figure 24:
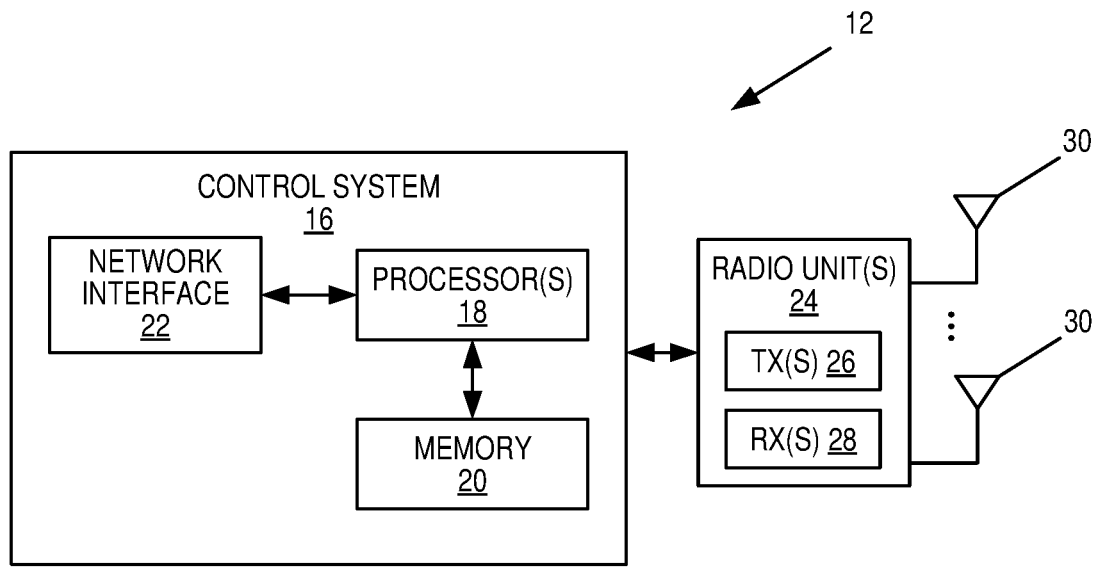
FIGS. 24 through 26 illustrate embodiments of a radio access node.

FIG. 24 is a schematic block diagram of the radio access node 12 according to some embodiments of the present disclosure. As illustrated, the radio access node 12 includes a control system 16 that includes one or more processors 18 (e.g., Central Processing Units (CPUs), Application Specific Integrated Circuits (ASICs), Field Programmable Gate Arrays (FPGAs), and/or the like), memory 20, and a network interface 22. In addition, the radio access node 12 includes one or more radio units 24 that each includes one or more transmitters 26 and one or more receivers 28 coupled to one or more antennas 30. In some embodiments, the radio unit(s) 24 is external to the control system 16 and connected to the control system 16 via, e.g., a wired connection (e.g., an optical cable). However, in some other embodiments, the radio unit(s) 24 and potentially the antenna(s) 30 are integrated together with the control system 16. The one or more processors 18 operate to provide one or more functions of a radio access node 12 as described herein. In some embodiments, the function(s) are implemented in software that is stored, e.g., in the memory 20 and executed by the one or more processors 18.

Figure 25:
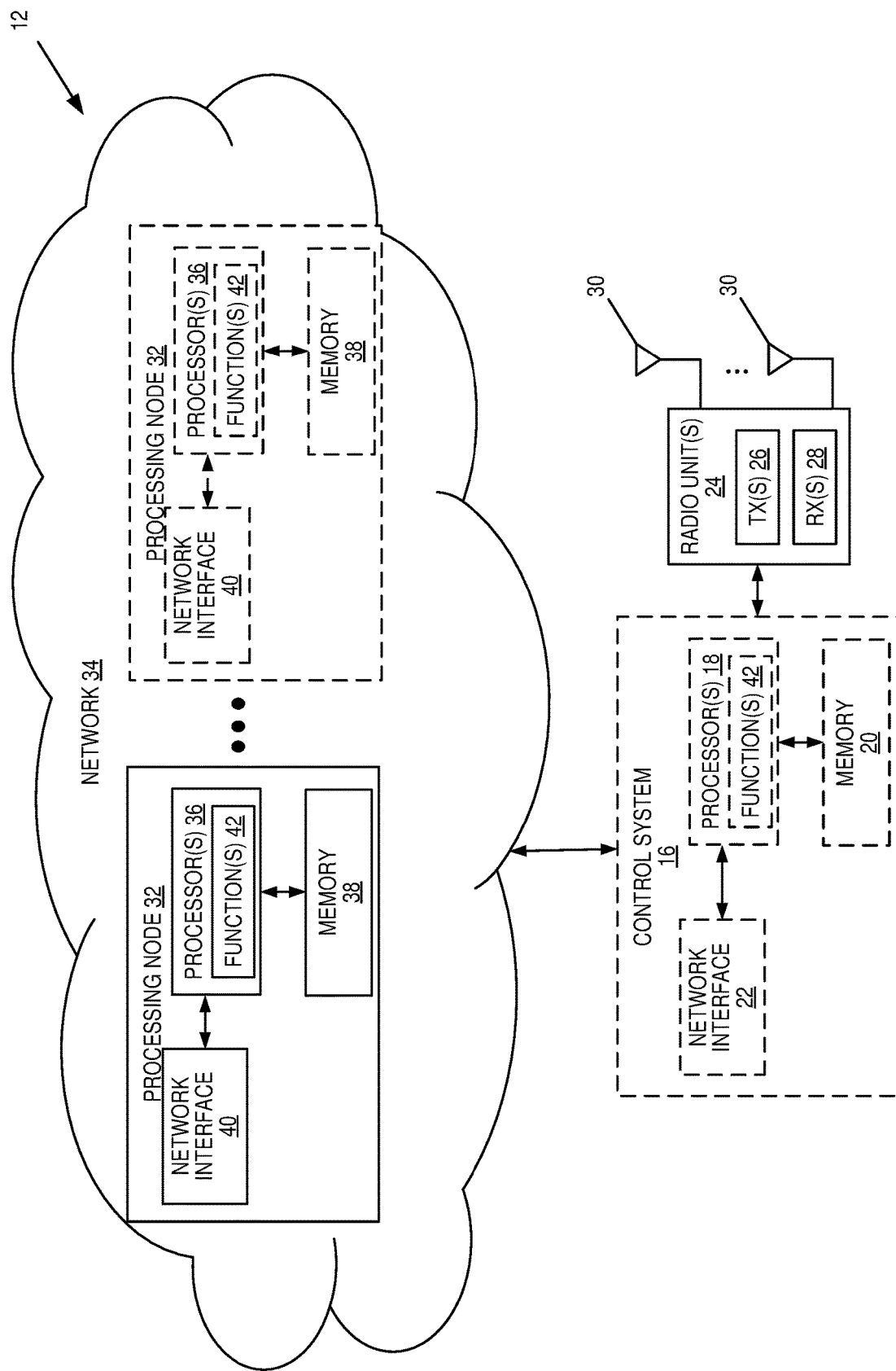

FIG. 25 is a schematic block diagram that illustrates a virtualized embodiment of the radio access node 12 according to some embodiments of the present disclosure. This discussion is equally applicable to other types of network nodes. Further, other types of network nodes may have similar virtualized architectures.

As used herein, a "virtualized" radio access node 12 is an implementation of the radio access node 12 in which at least a portion of the functionality of the radio access node 12 is implemented as a virtual component(s) (e.g., via a virtual machine(s) executing on a physical processing node(s) in a network(s)). As illustrated, in this example, the radio access node 12 includes the control system 16 (optional) that includes the one or more processors 18 (e.g., CPUs, ASICs, FPGAs, and/or the like), the memory 20, and the network interface 22 and the one or more radio units 24 that each includes the one or more transmitters 26 and the one or more receivers 28 coupled to the one or more antennas 30, as described above. The control system 16 is connected to the radio unit(s) 24 via, for example, an optical cable or the like. The control system 16 is connected to one or more processing nodes 32 coupled to or included as part of a network(s) 34 via the network interface 22. Each processing node 32 includes one or more processors 36 (e.g., CPUs, ASICs, FPGAs, and/or the like), memory 38, and a network interface 40.

In this example, functions 42 of the radio access node 12 described herein are implemented at the one or more processing nodes 32 or distributed across the control system 16 and the one or more processing nodes 32 in any desired manner. In some particular embodiments, some or all of the functions 42 of the radio access node 12 described herein are implemented as virtual components executed by one or more virtual machines implemented in a virtual environment(s) hosted by the processing node(s) 32. As will be appreciated by one of ordinary skill in the art, additional signaling or communication between the processing node(s) 32 and the control system 16 is used in order to carry out at least some of the desired functions 42. Notably, in some embodiments, the control system 16 may not be included, in which case the radio unit(s) 24 communicate directly with the processing node(s) 32 via an appropriate network interface(s).

In some embodiments, a computer program including instructions which, when executed by at least one processor, causes the at least one processor to carry out the functionality of a radio access node 12 or a node (e.g., a processing node 32) implementing one or more of the functions 42 of the radio access node 12 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 26:
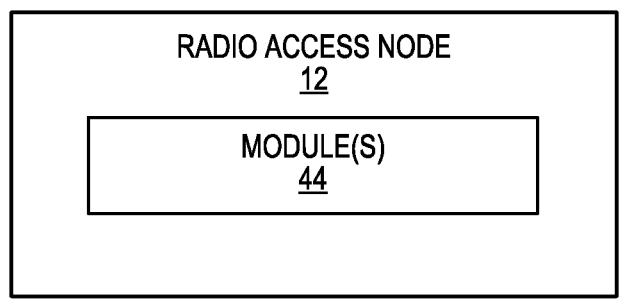

FIG. 26 is a schematic block diagram of the radio access node 12 according to some other embodiments of the present disclosure. The radio access node 12 includes one or more modules 44, each of which is implemented in software. The module(s) 44 provide the functionality of the radio access node 12 described herein. This discussion is equally applicable to the processing node 32 of FIG. 25 where the modules 44 may be implemented at one of the processing nodes 32 or distributed across multiple processing nodes 32 and/or distributed across the processing node(s) 32 and the control system 16.

Figure 27:
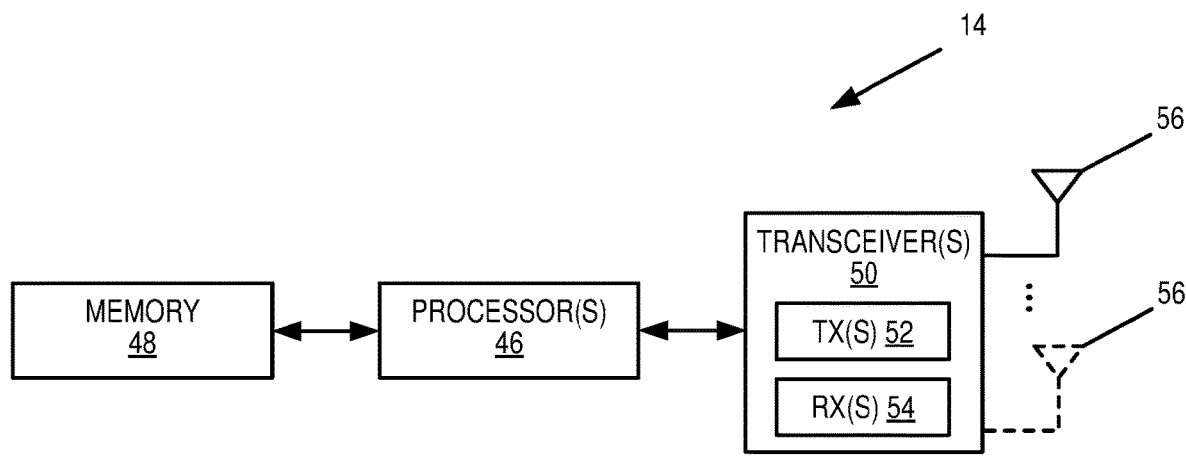
FIGS. 27 and 28 illustrate embodiments of a wireless device.

FIG. 27 is a schematic block diagram of a wireless device 14 according to some embodiments of the present disclosure. As illustrated, the wireless device 14 includes one or more processors 46 (e.g., CPUs, ASICs, FPGAs, and/or the like), memory 48, and one or more transceivers 50 each including one or more transmitters 52 and one or more receivers 54 coupled to one or more antennas 56. In some embodiments, the functionality of the wireless device 14 described above may be fully or partially implemented in software that is, e.g., stored in the memory 48 and executed by the processor(s) 46.

In some embodiments, a computer program including instructions which, when executed by at least one processor, causes the at least one processor to carry out the functionality of the wireless device 14 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 28:
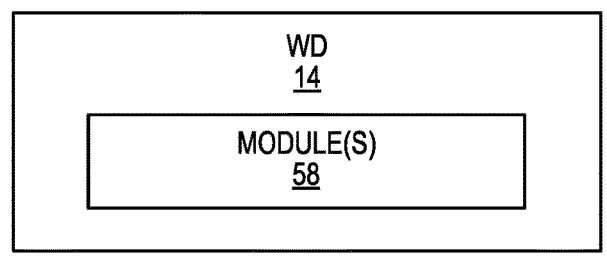

FIG. 28 is a schematic block diagram of the wireless device 14 according to some other embodiments of the present disclosure. The wireless device 14 includes one or more modules 58, each of which is implemented in software. The module(s) 58 provide the functionality of the wireless device 14 described herein.

While not being limited thereto, some example embodiments of the present disclosure are provided below.

Embodiment 1

A method of operation of a wireless device (14) in a cellular communications network (10), comprising: receiving (102) an uplink grant in TTI n; determining (104), based on a configured uplink/downlink configuration, an uplink scheduling timing l; and transmitting (106), in a TTI n+l, an uplink transmission in accordance with the uplink grant received in the TTI n.

Embodiment 2

The method of embodiment 1 wherein the uplink scheduling timing l is a smallest integer number of TTIs that is larger than or equal to a predefined minimum uplink scheduling timing value such that n+l is an uplink TTI.

Embodiment 3

The method of embodiments 1 wherein the uplink scheduling timing l is defined based on a load balancing approach in which uplink scheduling grants are equally distributed over different downlink TTIs.

Embodiment 4

The method of any one of embodiments 1 to 3 wherein the uplink grant schedules multiple uplink TTIs for the same wireless device (14).

Embodiment 5

The method of embodiment 4 wherein the uplink grant comprises an indication of one or more uplink TTIs for which the uplink grant is valid.

Embodiment 6

The method of any one of embodiments 1 to 5 wherein an uplink part of special SFs can be used for uplink data transmission, and determining (104) the uplink scheduling timing l comprises determining (104) the uplink scheduling timing l in such a manner that the uplink part of the special SFs are treated as uplink TTIs.

Embodiment 7

The method of embodiment 1 or 2 wherein determining the uplink scheduling timing l comprises determining (104) the uplink scheduling timing l based on a predefined table that defines values of l for different values of n for the TDD uplink/downlink configuration.

Embodiment 8

The method of embodiment 7 wherein the predefined table defines the values of l for the different values of n for the TDD uplink/downlink configuration in such a manner that an uplink part of special SFs are treated as uplink short TTIs.

Embodiment 9

The method of embodiment 7 wherein the predefined table defines the values of l for the different values of n for the TDD uplink/downlink configuration in such a manner that an uplink part of special SFs are not treated as uplink short TTIs.

Embodiment 10

The method of any one of embodiments 7 to 9 wherein the predefined table defines the values of l for the different values of n in accordance with a latency optimization scheme.

Embodiment 11

The method of any one of embodiments 7 to 9 wherein the predefined table defines the values of l for the different values of n in accordance with a load sharing scheme.

Embodiment 12

A wireless device (14) in a cellular communications network (10), the wireless device (14) adapted to: receive an uplink grant in TTI n; determine, based on a configured uplink/downlink configuration, an uplink scheduling timing l; and transmit, in a TTI n+l, an uplink transmission in accordance with the uplink grant received in the short TTI n.

Embodiment 13

The wireless device (14) of embodiment 12 wherein the wireless device (14) is further adapted to perform the method of any one of embodiments 2 to 11.

Embodiment 14

A wireless device (14) in a cellular communications network (10), comprising at least one transceiver (50), at least one processor (46), and memory (48) comprising instructions executable by the at least one processor (46) whereby the wireless device (14) is operable to: receive an uplink grant in TTI n; determine, based on a configured uplink/downlink configuration, an uplink scheduling timing l; and transmit, in a TTI n+l, an uplink transmission in accordance with the uplink grant received in the TTI n.

Embodiment 15

A wireless device (14) in a cellular communications network (10), the wireless device (14) comprising: a receiving module (58) operable to receive an uplink grant in TTI n; a determining module (58) operable to determine, based on a configured uplink/downlink configuration, an uplink scheduling timing l; and a transmitting module (58) operable to transmit, in a TTI n+l, an uplink transmission in accordance with the uplink grant received in the TTI n.

Embodiment 16

A method of operation of a radio access node (12) in a cellular communications network (10), comprising: transmitting (102) an uplink grant to a wireless device (14) in a TTI n; and receiving (106), in a TTI n+I, an uplink transmission from the wireless device (14) in accordance with the uplink grant transmitted to the wireless device (14) in the TTI n.

The following acronyms are used throughout this disclosure.

3GPP Third Generation Partnership Project
5G Fifth Generation
ASIC Application Specific Integrated Circuit
BLER Block Error Rate
CA Carrier Aggregation
CN Core Network
CPU Central Processing Unit
DCI Downlink Control Information
DwPTS Downlink Part of a Special Subframe
eNB Enhanced or Evolved Node B
EPDCCH Enhanced Physical Downlink Control Channel
FDD Frequency Division Duplexing
FPGA Field Programmable Gate Array
FS Frame Structure
GP Guard Period
HARQ Hybrid Automatic Repeat Request
HTTP Hypertext Transfer Protocol
LAA License Assisted Access
LTE Long Term Evolution
LSB Least Significant Bit
MME Mobility Management Entity
ms Millisecond
MSB Most Significant Bit
MTC Machine Type Communication
PDCCH Physical Downlink Control Channel
PDN Packet Data Network
P-GW Packet Data Network Gateway
PHICH Physical Hybrid Automatic Repeat Request Indicator Channel
PUSCH Physical Uplink Shared Channel
RAT Radio Access Technology
SCEF Service Capability Exposure Function
SF Subframe
SIB System Information Block
TCP Transmission Control Protocol
TDD Time Division Duplexing
TS Technical Specification
TTI Transmission Time Interval
UE User Equipment
UI Uplink Index
UpPTS Uplink Part of a Special Subframe Those skilled in the art will recognize improvements and modifications to the embodiments of the present disclosure. All such improvements and modifications are considered within the scope of the concepts disclosed herein.

What is claimed is:

1. A method of operation of a wireless device in a cellular communications network, comprising:
   receiving an uplink grant in a Transmission Time Interval, TTI, n;
   determining an uplink scheduling timing l based on a configured Time Division Duplexing, TDD, uplink/downlink configuration, the configured TDD uplink/downlink configuration being one of multiple TDD uplink/downlink configurations as defined at least in third-generation partnership project, 3GPP, TS 36.213; and
   transmitting, in a TTI n+l, an uplink transmission in accordance with the uplink grant received in the TTI n;
   wherein the uplink scheduling timing l is a smallest integer number of TTIs that is larger than or equal to a predefined minimum uplink scheduling timing value such that n+l is an uplink TTI and the predefined minimum uplink scheduling timing value is 2 or 3.

2. The method of claim 1 wherein the uplink grant schedules multiple uplink TTIs for the same wireless device.

3. The method of claim 1 wherein the uplink grant comprises an indication of one or more uplink TTIs for which the uplink grant is valid.

4. The method of claim 1 wherein an uplink part of special subframes can be used for uplink data transmission, and determining the uplink scheduling timing l comprises determining the uplink scheduling timing l in such a manner that the uplink part of the special subframes are treated as uplink TTIs.

5. The method of claim 1 wherein determining the uplink scheduling timing l comprises determining the uplink scheduling timing l in such a manner that the uplink part of the special subframes are not treated as uplink TTIs.

6. A wireless device for a cellular communications network, comprising:
   at least one transceiver;
   at least one processor; and
   memory comprising instructions executable by the at least one processor whereby the wireless device is operable to:
   receive an uplink grant in a Transmission Time Interval, TTI, n;
   determine an uplink scheduling timing l based on a configured Time Division Duplexing, TDD, uplink/downlink configuration, the configured TDD uplink/downlink configuration being one of multiple TDD uplink/downlink configurations as defined at least in third-generation partnership project, 3GPP, TS 36.213; and
   transmit, in a TTI n+l, an uplink transmission in accordance with the uplink grant received in the TTI n;
   wherein the uplink scheduling timing l is a smallest integer number of TTIs that is larger than or equal to a predefined minimum uplink scheduling timing value such that n+l is an uplink TTI and the predefined minimum uplink scheduling timing value is 2 or 3.

7. The wireless device of claim 6 wherein the uplink grant schedules multiple uplink TTIs for the same wireless device.

8. The wireless device of claim 6 wherein the uplink grant comprises an indication of one or more uplink TTIs for which the uplink grant is valid.

9. The wireless device of claim 6 wherein an uplink part of special subframes can be used for uplink data transmission, and determining the uplink scheduling timing l comprises determining the uplink scheduling timing l in such a manner that the uplink part of the special subframes are treated as uplink TTIs.

10. The wireless device of claim 6 wherein determining the uplink scheduling timing l comprises determining the uplink scheduling timing l in such a manner that the uplink part of the special subframes are not treated as uplink TTIs.

11. The wireless device of claim 6 wherein the configured TDD uplink/downlink configuration is Long Term Evolution, LTE, TDD uplink/downlink configuration 1, and determining the uplink scheduling timing l comprises determining the uplink scheduling timing l such that:
the uplink scheduling timing l is 3 if n=0;
the uplink scheduling timing l is 5 if n=1 and if UpPTS contains PUSCH;
the uplink scheduling timing l is 3 if n=4;
the uplink scheduling timing l is 3 if n=5;
the uplink scheduling timing l is 5 if n=6 and if UpPTS contains PUSCH; and
the uplink scheduling timing l is 3 if n=9.

12. The wireless device of claim 6 wherein the configured TDD uplink/downlink configuration is Long Term Evolution, LTE, TDD uplink/downlink configuration 2, and determining the uplink scheduling timing l comprises determining the uplink scheduling timing l such that:
the uplink scheduling timing l is 3 if n=3 and if UpPTS contains PUSCH;
the uplink scheduling timing l is 3 if n=4;
the uplink scheduling timing l is 3 if n=8 and if UpPTS contains PUSCH; and
the uplink scheduling timing l is 3 if n=9.

13. The wireless device of claim 6 wherein the configured TDD uplink/downlink configuration is Long Term Evolution, LTE, TDD uplink/downlink configuration 3, and determining the uplink scheduling timing l comprises determining the uplink scheduling timing l such that:
the uplink scheduling timing l is 3 if n=0;
the uplink scheduling timing l is 3 if n=1;
the uplink scheduling timing l is 3 if n=8 and if UpPTS contains PUSCH; and
the uplink scheduling timing l is 3 if n=9.

14. The wireless device of claim 6 wherein the configured TDD uplink/downlink configuration is Long Term Evolution, LTE, TDD uplink/downlink configuration 4, and determining the uplink scheduling timing l comprises determining the uplink scheduling timing l such that:
the uplink scheduling timing l is 3 if n=0;
the uplink scheduling timing l is 3 if n=8 and if UpPTS contains PUSCH; and
the uplink scheduling timing l is 3 if n=9.

15. The wireless device of claim 6 wherein the configured TDD uplink/downlink configuration is Long Term Evolution, LTE, TDD uplink/downlink configuration 5, and determining the uplink scheduling timing l comprises determining the uplink scheduling timing l such that:
the uplink scheduling timing l is 3 if n=8 and if UpPTS contains PUSCH; and
the uplink scheduling timing l is 3 if n=9.

16. The wireless device of claim 6 wherein determining the uplink scheduling timing l comprises determining the uplink scheduling timing l based on the configured TDD uplink/downlink configuration and an uplink index comprises the uplink grant received in the TTI n.

17. The wireless device of claim 6 wherein the TTI n and the TTI n+l are 1 millisecond TTIs.

18. A method of operation of a radio access node in a cellular communications network, comprising:
transmitting an uplink grant to a wireless device in a Transmission Time Interval, TTI, n; and
receiving, in a TTI n+l, an uplink transmission from the wireless device in accordance with the uplink grant transmitted to the wireless device in the TTI n, where l is an uplink scheduling timing l and is a function of a configured Time Division Duplexing, TDD, uplink/downlink configuration, the configured TDD uplink/downlink configuration being one of multiple TDD uplink/downlink configurations as defined at least in third-generation partnership project, 3GPP, TS 36.213;
wherein the uplink scheduling timing l is a smallest integer number of TTIs that is larger than or equal to a predefined minimum uplink scheduling timing value such that n+l is an uplink TTI and the predefined minimum uplink scheduling timing value is 2 or 3.

19. The method of claim 18 wherein the uplink grant schedules multiple uplink TTIs for the same wireless device.

20. The method of claim 18 wherein the uplink grant comprises an indication of one or more uplink TTIs for which the uplink grant is valid.

21. The method of claim 18 wherein an uplink part of special subframes can be used for uplink data transmission, and the uplink scheduling timing l is determined in such a manner that the uplink part of the special subframes are treated as uplink TTIs.

22. The method of claim 18 wherein the uplink scheduling timing l is determined in such a manner that the uplink part of the special subframes are not treated as uplink TTIs.

23. A radio access node for a cellular communications network, comprising:
at least one transmitter and at least one receiver;
at least one processor; and
memory comprising instructions executable by the at least one processor whereby the radio access node is operable to:
transmit an uplink grant to a wireless device in a Transmission Time Interval, TTI, n; and
receive, in a TTI n+l, an uplink transmission from the wireless device in accordance with the uplink grant transmitted to the wireless device in the TTI n, where l is an uplink scheduling timing and is a function of a configured Time Division Duplexing, TDD, uplink/downlink configuration, the configured TDD uplink/downlink configuration being one of multiple TDD uplink/downlink configurations as defined at least in third-generation partnership project, 3GPP, TS 36.213;
wherein the uplink scheduling timing l is a smallest integer number of TTIs that is larger than or equal to a predefined minimum uplink scheduling timing value such that n+l is an uplink TTI and the predefined minimum uplink scheduling timing value is 2 or 3.

24. The radio access node of claim 23 wherein the uplink scheduling timing l is a smallest integer number of TTIs that is larger than or equal to a predefined minimum uplink scheduling timing value such that n+l is an uplink TTI and the predefined minimum uplink scheduling timing value is 2 or 3.

25. The radio access node of claim 23 wherein the uplink grant schedules multiple uplink TTIs for the same wireless device.

26. The radio access node of claim 23 wherein the uplink grant comprises an indication of one or more uplink TTIs for which the uplink grant is valid.

27. The radio access node of claim 23 wherein an uplink part of special subframes can be used for uplink data transmission, and the uplink scheduling timing l is determined in such a manner that the uplink part of the special subframes are treated as uplink TTIs.

28. The radio access node of claim 23 wherein the uplink scheduling timing l is determined in such a manner that the uplink part of the special subframes are not treated as uplink TTIs.

29. The radio access node of claim 23 wherein the configured TDD uplink/downlink configuration is Long Term Evolution, LTE, TDD uplink/downlink configuration 1, and:
   the uplink scheduling timing l is 3 if n=0;
   the uplink scheduling timing l is 5 if n=1 and if UpPTS contains PUSCH;
   the uplink scheduling timing l is 3 if n=4;
   the uplink scheduling timing l is 3 if n=5;
   the uplink scheduling timing l is 5 if n=6 and if UpPTS contains PUSCH; and
   the uplink scheduling timing l is 3 if n=9.

30. The radio access node of claim 23 wherein the configured TDD uplink/downlink configuration is Long Term Evolution, LTE, TDD uplink/downlink configuration 2, and:
   the uplink scheduling timing l is 3 if n=3 and if UpPTS contains PUSCH;
   the uplink scheduling timing l is 3 if n=4;
   the uplink scheduling timing l is 3 if n=8 and if UpPTS contains PUSCH; and
   the uplink scheduling timing l is 3 if n=9.

31. The radio access node of claim 23 wherein the configured TDD uplink/downlink configuration is Long Term Evolution, LTE, TDD uplink/downlink configuration 3, and:
   the uplink scheduling timing l is 3 if n=0;
   the uplink scheduling timing l is 3 if n=1;
   the uplink scheduling timing l is 3 if n=8 and if UpPTS contains PUSCH; and
   the uplink scheduling timing l is 3 if n=9.

32. The radio access node of claim 23 wherein the configured TDD uplink/downlink configuration is Long Term Evolution, LTE, TDD uplink/downlink configuration 4, and:
   the uplink scheduling timing l is 3 if n=0;
   the uplink scheduling timing l is 3 if n=8 and if UpPTS contains PUSCH; and
   the uplink scheduling timing l is 3 if n=9.

33. The radio access node of claim 23 wherein the configured TDD uplink/downlink configuration is Long Term Evolution, LTE, TDD uplink/downlink configuration 5, and:
   the uplink scheduling timing l is 3 if n=8 and if UpPTS contains PUSCH; and
   the uplink scheduling timing l is 3 if n=9.

34. The radio access node of claim 23 wherein the uplink scheduling timing l is determined based on the configured TDD uplink/downlink configuration and an uplink index comprised in the uplink grant in the TTI n.

35. The radio access node of claim 23 wherein the TTI n and the TTI n+1 are 1 millisecond TTIs.

* * * * *